US010643189B1

(12) United States Patent
Smith et al.

(10) Patent No.: US 10,643,189 B1
(45) Date of Patent: May 5, 2020

(54) SOFTWARE PRODUCT ACTIVATION FOR ON-LINE BANKING CUSTOMERS

(75) Inventors: Leslie J. Smith, Jefferson, GA (US); Michael C. Morgan, Athens, GA (US); Marcus A. Holt, Commerce, GA (US); Eric T. Horne, Newbury Park, CA (US); Eric T. Hollinshead, Statham, GA (US); Harriet A. Henderson, Pasadena, CA (US); Gregory D. Yenney, Ventura, CA (US); Matthew M. Thomas, Los Angeles, CA (US)

(73) Assignee: INTUIT INC., Mountain View, CA (US)

( * ) Notice: Subject to any disclaimer, the term of this patent is extended or adjusted under 35 U.S.C. 154(b) by 1404 days.

(21) Appl. No.: 12/433,853

(22) Filed: Apr. 30, 2009

(51) Int. Cl.
*G06Q 40/00* (2012.01)
*G06Q 20/00* (2012.01)

(52) U.S. Cl.
CPC .................................... *G06Q 20/00* (2013.01)

(58) Field of Classification Search
CPC ........................................................ G06Q 40/00
USPC ............................................................ 705/35, 42
See application file for complete search history.

(56) References Cited

U.S. PATENT DOCUMENTS

| | | | | |
|---|---|---|---|---|
| 5,903,881 | A * | 5/1999 | Schrader et al. | 705/42 |
| 7,251,633 | B2 * | 7/2007 | Ludtke | G06Q 20/10 235/375 |
| 7,958,030 | B2 * | 6/2011 | Kemper et al. | 705/35 |
| 8,433,127 | B1 * | 4/2013 | Harpel | G06K 9/036 382/139 |
| 8,458,051 | B1 * | 6/2013 | Saltzman | G06Q 10/06 705/26.7 |
| 8,708,227 | B1 * | 4/2014 | Oakes, III | G06Q 20/04 235/379 |
| 2002/0055909 | A1 * | 5/2002 | Fung et al. | 705/42 |
| 2002/0065772 | A1 * | 5/2002 | Saliba | G06Q 20/10 705/40 |
| 2003/0097331 | A1 * | 5/2003 | Cohen | 705/39 |
| 2004/0267665 | A1 * | 12/2004 | Nam et al. | 705/41 |
| 2006/0112011 | A1 * | 5/2006 | Al-Ali | G06Q 20/04 705/42 |

(Continued)

OTHER PUBLICATIONS

US Bank, Mar. 2008.*

(Continued)

*Primary Examiner* — Bruce I Ebersman
*Assistant Examiner* — John A Anderson
(74) *Attorney, Agent, or Firm* — DLA Piper LLP (US)

(57) ABSTRACT

Methods, systems and computer program products for activating a software product for use by a customer of a financial institution that accesses an on-line banking product on an on-line banking server. A request from the financial institution to activate the software product for use by the customer is received through an interface such as an extranet site of a host of the on-line banking product. An enablement request is transmitted from the interface to an activation server, and a script on the activation server is executed to modify a configuration element to automatically activate the software program for the customer. Thus, the financial institution, which does not host the on-line banking product, drives automatic activation of the software product without manual input by project managers or technical support persons of the on-line banking product host.

42 Claims, 19 Drawing Sheets

(56) References Cited

U.S. PATENT DOCUMENTS

| | | | |
|---|---|---|---|
| 2007/0130073 A1* | 6/2007 | Celli | G06F 21/121 |
| | | | 705/51 |
| 2008/0010190 A1* | 1/2008 | Rackley, III et al. | 705/39 |
| 2008/0010198 A1* | 1/2008 | Eliscu | 705/40 |
| 2008/0091600 A1* | 4/2008 | Egnatios et al. | 705/42 |
| 2008/0189209 A1* | 8/2008 | Loomis | G06Q 20/10 |
| | | | 705/44 |
| 2008/0255952 A1* | 10/2008 | Yen | G06Q 30/0241 |
| | | | 705/14.4 |
| 2008/0313047 A1* | 12/2008 | Casares et al. | 705/17 |
| 2009/0076966 A1* | 3/2009 | Bishop et al. | 705/67 |
| 2010/0280946 A1* | 11/2010 | Batten | G06Q 20/02 |
| | | | 705/42 |

OTHER PUBLICATIONS

DBS Bank Selects Eontec for Next Generation Internet Banking Service Publication info: Business Wire (Year: 2003).*

MyDI User Guide, Feature and Functionality Overview, Oct. 2008, available from https://my.digitalinsight.com/, (Appendix A) (26 pages).

MyDI Training Webcast, Mar. 27, 2008, available from https://my.digitalinsight.com/, (Appendix B) (23 pages).

* cited by examiner

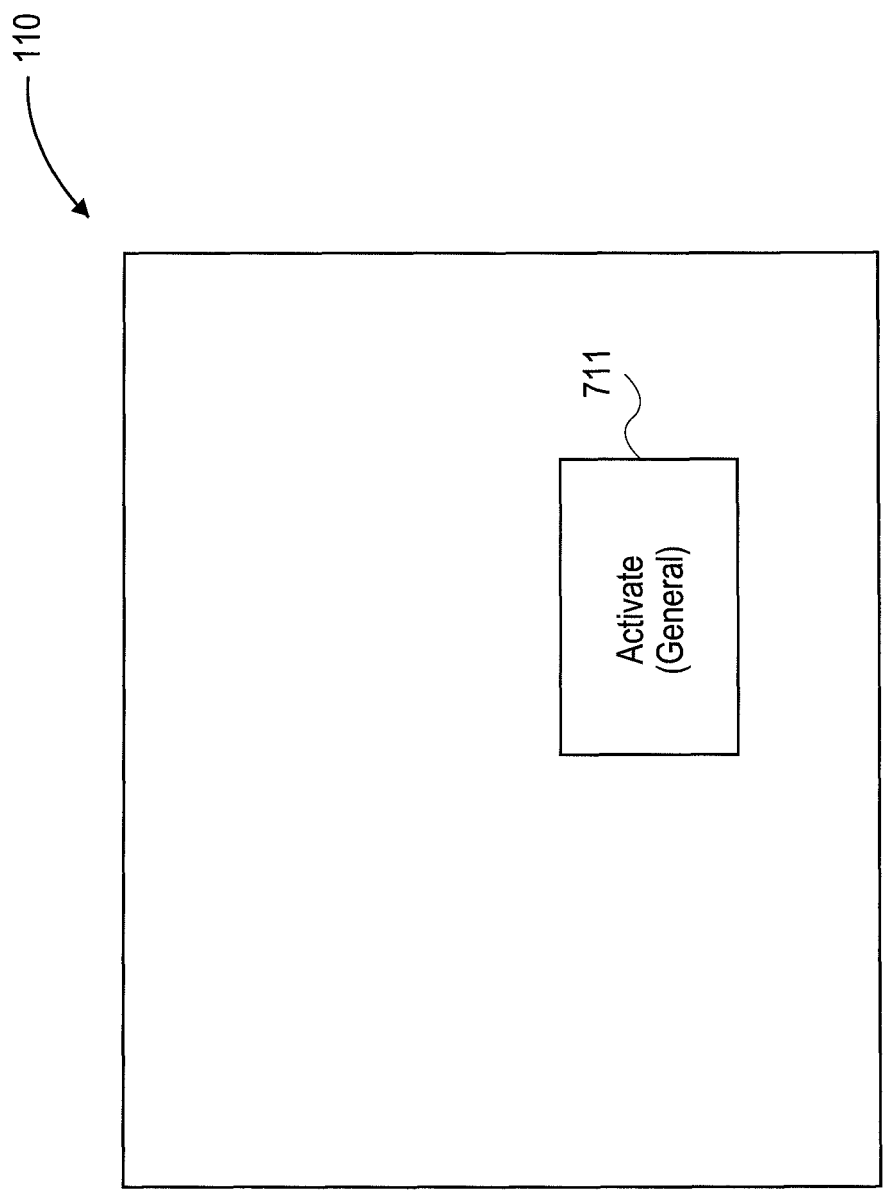

SOFTWARE PRODUCT ACTIVATION FOR ON-LINE BANKING CUSTOMERS

BACKGROUND

The invention relates generally to activation of software products in applications including on-line or Internet banking. On-line or Internet banking has become increasingly popular and has greatly simplified how customers conduct banking and financial transactions and how they manage their finances. On-line banking allows bank customers to manage and track various financial applications such as deposits, withdraws, loan amounts, credit card amounts, and other financial matters at the user's convenience and at various locations and at various times. The popularity of on-line banking is evident by estimates that more than 50 million households will conduct banking transactions on-line by the year 2010.

One known on-line banking system is implemented using an on-line banking program that executes on an on-line banking or production server (generally referred to as a production server), which may be managed by a third party host on behalf of a financial institution such as a bank, savings and loan, credit union, credit card company, mortgage company or loan company (generally referred to as financial institution). A production server may include pages or files for serving one or multiple financial institutions and may include or be comprised of one or multiple servers (generally referred to as a production server). A server of the financial institution is coupled to the production server such that data relating to customer accounts is provided to the production server on the back-end of the system, and this data is processed and managed by an on-line banking software product on the production server. During use, a customer may use a web browser and a customer computer on the front-end of the system to access his or her account on the production server via a network using the on-line banking product. One example of a third party host that provides production servers and these types of on-line banking services to financial institutions and their customers is Digital Insight, a unit of Intuit Inc, Mountain View, Calif.

Sometimes, a software product or "add on" software product (generally referred to as a software product) is offered by the third party host and may be activated such that it can be utilized with or supplement the on-line banking product that is used for on-line banking or other on-line financial transactions. Examples of such software products include personal finance, accounting and tax preparation software products that are used by the customer to track and manage personal and business finance, accounting and tax matters. Other examples of such software products include software products that are used for particular tasks such as check imaging, bill payment, on-line statements and configuring or updating of Internet banking software products. Such software products may provide enhanced services and capabilities thus resulting in higher customer satisfaction, customer retention, increased use of the site by the customer, and increased bank deposits.

Each financial institution may select the software products that are to be activated such that they can be accessed by their respective customers, e.g., through the on-line banking site that is managed by the third party host. Thus, certain financial institutions may offer selected software products, whereas others may not even if these financial institutions are managed by the same host. Financial institutions that activate software products for their on-line banking customers may be charged a fee by the third party host. The fee may, for example, be based on the number of on-line banking customers that utilize the software product, usage during a specific time frame, a number of transactions, etc.

Configuring or enabling software products or add-on software products, however, can be quite cumbersome and time consuming. Currently, software products are manually activated by a programmer or manager of the third party host, examples of which include Digital Insight and website hosting companies. More specifically, a technical support person may receive a request from the financial institution to enable a particular software product or add-on, and in response, manually edit configuration files such that changes to the production server allow a customer who accesses the production sever to also access the newly activated software product as a result of manual configuration. Such manual configurations may involve ensuring that the software product is activated and accessible to a customer using a single sign-on (SSO) who logs onto his or her account through the on-line banking product using single sign-on.

During certain known activation procedures, a project manager or technical support person of a third party host is assigned to each financial institution to configure the software products requested by each financial institution and to respond to questions or troubleshoot questions from the financial institutions to address issues that arise during deployment of the software products. For example, a third party host may dedicate multiple technical support people to manage troubleshooting issues via telephone, e-mail and secure chat. Such procedures involve substantial human resources, time, and hand-holding of the financial institution as software product deployment issues are resolved. Further, the results that are achieved through the use of project managers and technical support people may not be consistent since different people may approach the same or similar problems in different ways, and these different approaches may lead to different or less effective results. These inconsistencies may also result in more time and effort being dedicated to activating a software product. Further, these inconsistencies, technical difficulties and manual processes may result in lower quality results and difficulties with activation as a result of higher error rates. These issues and shortcomings become increasingly important as on-line banking becomes increasingly popular.

SUMMARY

One embodiment is directed to a method for automatically activating a software product for use by a customer of a financial institution that accesses an on-line banking product on an on-line banking server. The method comprises receiving, through an interface, a request from the financial institution to activate the software product for use by the customer. The method further comprises transmitting an enablement request from the interface to an activation server and executing one or more instructions on the activation server to automatically activate the software program for the customer. Thus, activation of the software program is driven by the financial institution and done automatically in response to the request by the financial institution without manual input by a host of the on-line banking server or on-line banking product.

Another embodiment is directed to a system for automatically activating a software product for use by a customer of a financial institution who accesses an on-line banking server to utilize an on-line banking product. The system comprises a financial institution computer, an activation server and an interface. The interface is operably coupled to or in communication with the financial institution computer and the activation server. A request to activate or enable the software product for use by the customer is sent by the financial institution computer to the interface, which is configured or operable to transmit an enablement request to the activation server. One or more instructions on the activation server are executed to automatically activate the software program for the customer. Thus, the system is configured such that activation of the software program is driven by the financial institution and done automatically in response to the request by the financial institution without manual input by a host of the on-line banking server or on-line banking product.

A further embodiment is directed to a computer program product or tangible medium comprising a computer program carrier readable by a computer and embodying one or more instructions executable by the computer to perform method steps for activating a software product for use by a customer of a financial institution, the customer accessing an on-line banking product on an on-line banking server, the method steps comprising receiving, through an interface, a request from the financial institution to activate the software product for use by the customer, transmitting an enablement request from the interface to an activation server and executing one or more instructions on the activation server to automatically activate the software program for the customer.

In one or more embodiments, the on-line banking server is not a server of the financial institution and is hosted by a third party that manages on-line banking products and on-line banking or production servers. Activation of the software product may be driven by the financial institution through an extranet interface without manual input by the third party host of the on-line banking server.

In one or more embodiments, a determination of a lock status is performed. The lock status may be a lock status of a configuration file, a lock status of a component or software product being configured, or a lock status of a site. If the component or product is available to receive configuration changes, or is unlocked, then data collected utilizing the interface is sent to the activation server. Data collected using the interface may include, for example, data related to one or more of the financial institution, the software product and the customer, and this data may be received at the interface from the financial institution and/or from database, e.g. a customer relationship database. Upon receiving the required data, the interface can present or display to the financial institution a page, icon or button that allows the financial institution to launch activation of the software product. Data may also be sent from the interface to the database, e.g., to bill the financial institution for the activated software product. One or more instructions, e.g., a script, that executes on the activation server may be executed against a configuration server having a configuration file. The configuration server may be on an intermediate or staging server, changes to which are synchronized to a production server hosting an on-line banking product, thereby automatically activating the software product on the on-line banking or production server. Thus, with embodiments, the financial institution, which does not host the on-line banking server, drives activation of the software product through the interface without manual input by a host of the on-line banking server. Further, the financial institution can control the pace at which the software product is activated.

In one or more embodiments, a software product is automatically activated on a limited basis for selected customers. The financial institution can select which customers are selected for this purpose. For example, the software product can be tested by the selected customers, and then the software product can be automatically activated on a general or global basis for all of the customers of the financial institution. This can be done by defining a user group as a configuration parameter, which is modified according to embodiments.

According to one or more embodiments, the software program that is automatically activated is an on-line personal finance software product that can be accessed through the on-line banking product. Other embodiments may involve on-line business finance software, e.g., a business banking software product.

For example, an on-line personal finance or banking software product may simultaneously display financial accounts of different financial institutions to the customer such that the customer is presented with a global view of his or her finances by signing onto the on-line banking product, and without having to sign onto to other servers, which may be less secure than the production server that hosts the on-line banking product and with which the customer is familiar.

BRIEF DESCRIPTION OF THE DRAWINGS

The foregoing and other aspects of embodiments are described in further detail with reference to the accompanying drawings, wherein:

FIG. 5E generally illustrates how a financial institution may launch general or global activation of a software product by selecting or clicking an icon or button;

DETAILED DESCRIPTION OF ILLUSTRATED EMBODIMENTS

Embodiments are directed to automatic activation of software products in business-to-business (B2B) applications, e.g., for an on-line banking or financial products (generally referred to as on-line banking product) that is hosted by an on-line banking or production server without the need for project managers or technical support people of a third party host to manually configure or manually enable the software products. With embodiments, the need for project managers or technical support people to manually program or configure files to install or enable a software product for use by an on-line banking customer is significantly reduced or eliminated. Embodiments provide for a streamlined and automated activation process, thereby improving the time required to activate new software products. Further, given the manner in which embodiments function, embodiments provide for consistent and software product installations in contrast to known methods that rely on technical support persons and that may result in inconsistent or different solutions to the same or problems. Additionally, with embodiments, automated activation of software products is driven or requested by the financial institution as opposed to a host of an on-line or production server. The financial institution can proceed with the activation at a desired pace. If necessary, reminders or messages can be sent to the financial institution, and the activation process can be tracked to determine whether a further reminder or action is necessary and to determine when a billing cycle should begin. Various embodiments of the invention and aspects thereof are described with reference to FIGS. 1-8.

Figure 1:
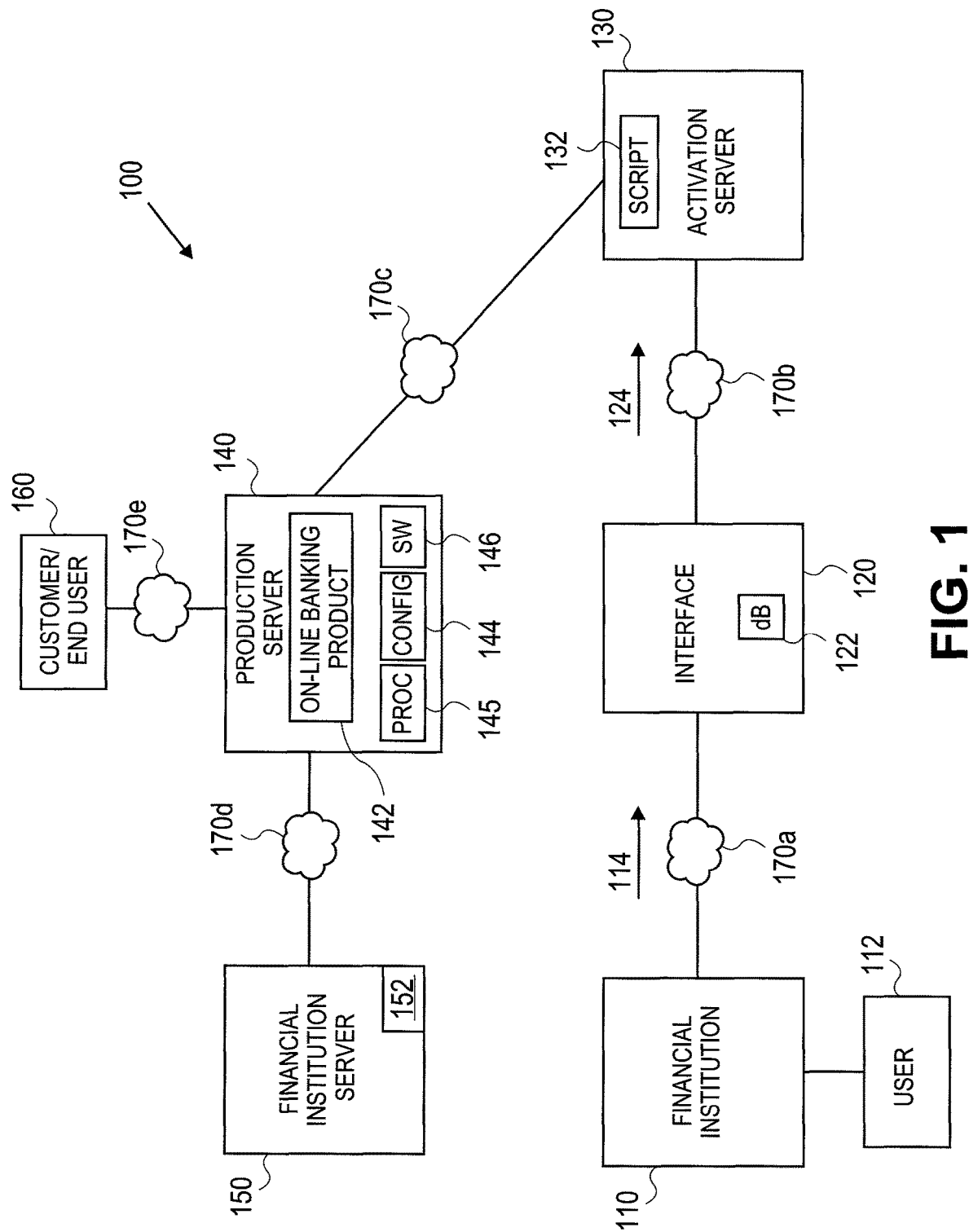
FIG. 1 is a block diagram of a system constructed according to one embodiment and illustrating one or more instructions or scripts on an activation server that are executed to modify a configuration of a production server hosting an on-line banking product.

Referring to FIG. 1, a system 100 constructed according to one embodiment includes a financial institution computer or computing element 110 (generally referred to as financial institution or "FI" in certain other figures) that is utilized by an employee, technical support person, owner or other user 112 (generally referred to as user 112) of the financial institution 110, an interface computing element or interface 120 (generally referred to as an interface) with which the financial institution 110 or user 112 interacts, an activation computing component or element 130 such as an activation server, and one or more on-line banking or production computing elements or servers 140. A computing element such as a server 150 of the financial institution 110 includes financial or account data 152 that is processed by the on-line banking product or program 142 that may, for example, reside on the production server 140. An end user or customer 160 of the financial institution 110 accesses his or her account on-line by accessing the production server 140 and utilizes the on-line banking product 142 to perform on-line banking or other financial transactions and manage personal or business finance matters. The financial institution 110 and the financial institution server 150 may be at the same location or at different locations, e.g., if the financial institution server 150 may be a local or remote server.

According to one embodiment, the financial institution 110 is bank, a savings and loan, a credit union, or other financial institution or company (generally referred to as "financial institution") that may utilize on-line account processing or on-line account management. For ease of explanation, reference is made generally to a financial institution 110. In certain embodiments, the interface 120 is an extranet site, a website, such as an internal website, or a report that provides for secure communications between the financial institution 110 and a host of the on-line banking or production server 140. For ease of explanation, reference is made generally to an interface 120 or to an extranet site.

The system 100 may include one or more production servers 140 that are configured to provide on-line banking services to a customer 160 on behalf of one or more financial institutions 110. While systems 100 may include multiple production servers 140, one production server 140 is shown in FIG. 1 for ease of explanation and illustration, but it should be understood that embodiments may involve various numbers of financial institutions 110, various numbers of production servers 140 and various numbers of customers 150. Further, it should be understood that a production server 140 may serve one or multiple financial institutions 110 and one or multiple customers 160.

The financial institution 110 is operably coupled to or in communication with the interface 120 via a network 170a. The interface 120 is operably coupled to or in communication with the activation server 130 via a network 170b. The activation server 130 is operably coupled to or in communication with the production server 140 via a network 170c. The production server 140 is operably coupled to or in communication with the server 150 of the financial institution 110 via a network 170d. A customer 160 of the financial institution 110 can access the production server 140 to conduct on-line banking and financial transactions using the on-line banking product 142 using a network 170e. Thus, as shown in FIG. 1, at the front-end of the system, the customer 160 can utilize the on-line banking product for on-line access to an account, but does not have access the interface 120 in communication between the financial institution computer 110 and the activation server 130 through respective networks 170a-b. The networks 170a-e (generally 170), and other networks 170 discussed herein, may be a Local Area Network (LAN), a Wide Area Network (WAN), Metropolitan Area Network (MAN), a wireless network, other suitable networks capable of transmitting data, or a network 170 may be a combination of such networks or utilize different communication methods or protocols. For ease of explanation, reference is made to a network 170 generally, but various networks 170 may be utilized.

The activation server 130 includes or accesses one or more executable instructions 132 that are operable to create a new configuration 144 on the production server 140 or modify the configuration 144 (e.g., a configuration element such as a configuration file, object or other component) (illustrated as "config" in certain figures) on the production server 140 to automatically activate or enable a software product, supplement or add-on 146 (generally referred to as software product or "SW" in certain figures) for use with the on-line banking product 142. According to one embodiment, the one or more executable instructions 132 are one or more scripts. With embodiments, a software product 146 can be enabled by modifying an existing configuration element 144 or by generating a new configuration 144. For ease of explanation, reference is made to modifying a configuration element 144, but such modifications are defined to include generating a new configuration element 144.

Figure 2:
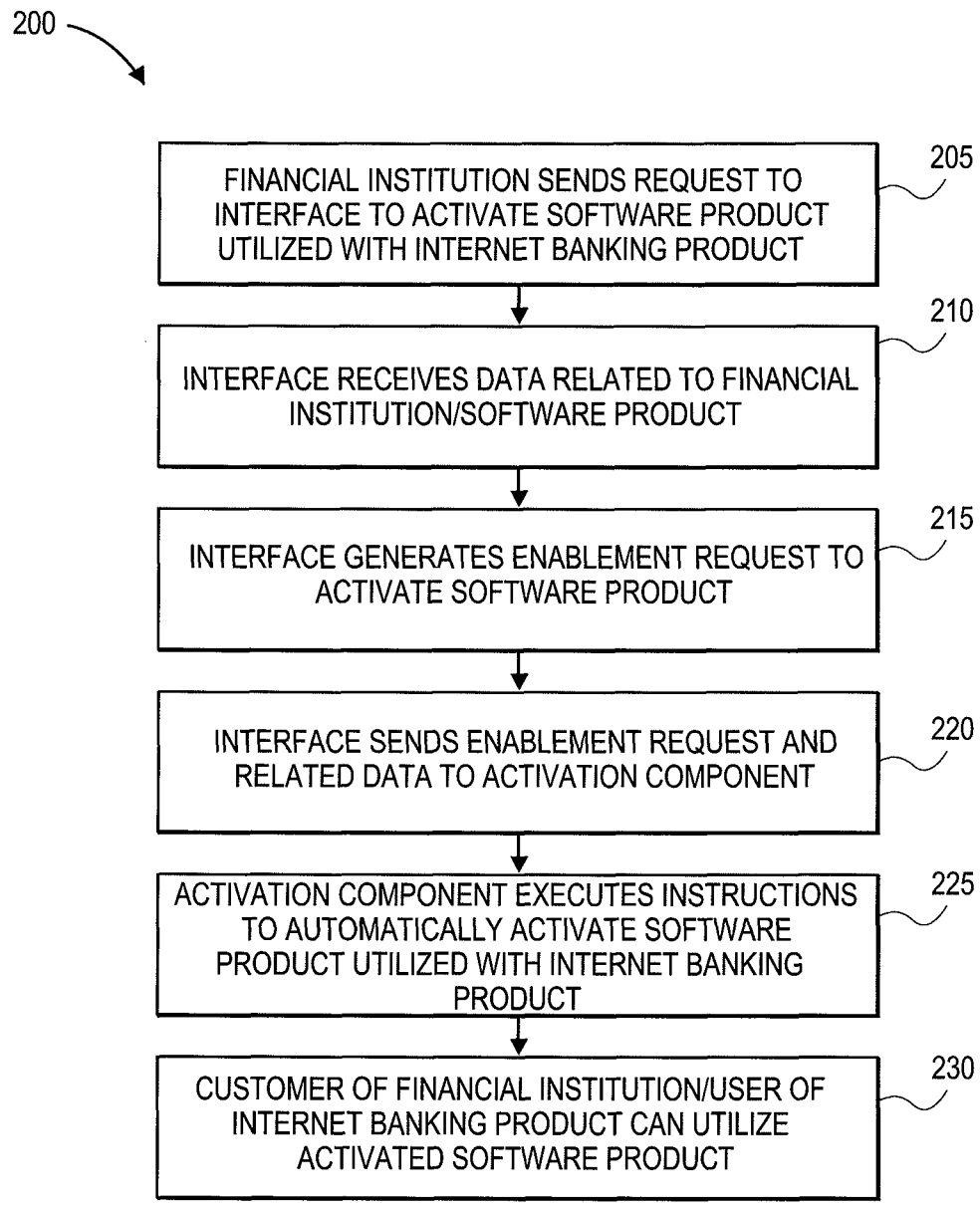
FIG. 2 is a flow chart of a method for automatically activating a software product using the system illustrated in FIG. 1.

Referring to FIG. 2, and with continuing reference to FIG. 1, one embodiment of a method 200 for automatically activating a software product 146 that it utilized with, accessed through, or related to, the on-line banking product 142, and that allows a customer 160 of a financial institution 110 to conduct on-line banking or other finance transactions includes, at stage 205, receiving, at or through the interface 120, a request 114 from the financial institution 110 to automatically activate the software product 146 at stage 205. At stage 210, data related to the request 114 is gathered by the interface 120, e.g., from the financial institution 110 or from another data source. The retrieved data may be stored in memory, data store or a database 122 of the interface 120 or other accessible location. FIG. 1 illustrates the database 122 as a local database that resides on the interface 120, but embodiments may also be implemented using a remote database 122. At stage 215, an enablement request 124 is generated by the interface 120, and at stage 220, the enablement request 124 is transmitted from the interface 120 to the activation server 130. In FIG. 1, the enablement request 124 is shows as a request transmitted by the interface 120 to the activation server 130, but the enablement request 124 may also be considered to be a combination of communications 114 and 124. For ease of explanation, reference is made to an enablement request 124.

The system shown in FIG. 1 and the method 200 shown in FIG. 2 may include or involve various communications (not shown in these figures) between system components to ensure secure communications. For example, after stage 210, and before stage 215, the interface 120 may store answers in a data store or repository, and between stages 220 and 225, the activation server 130 may request collected configuration data from the interface 120 repository. The interface 220 may send a request containing an action and some information related to how to obtain responses collected by the customer 160. Between stages 220 and 225, the responses are collected from the interface 120 repository. These communications are performed for security reasons to prevent someone from sending configuration data to the activation server 130 and maliciously changing configuration data 144 and to ensure that communications between system components are conducted in a secure and trusted manner. It should be understood that other security measures may be utilized, and that these security methods or steps are examples of security methods or steps that may be utilized.

At stage 225, one or more instructions or scripts 132 are executed by or on the activation server 130 to trigger a processing or other suitable component 145 ("proc" in certain figures) on the production server 140 to modify the configuration element 144 to automatically activate the software product 146 for the customer 160. According to one embodiment, scripts 132 are based on a PERL library that adheres to certain application programming interface (API) standards. For example, a script 132 may be code that configures a software product such as an on-line banking product 142 by editing a configuration element 144 and/or initiating some other type of action such as changing a database, restarting a service, and other actions. With embodiments, scripts 132 are executed to automatically activate the software product 146 for use with the on-line banking product 142 since the software product 146 is activated at the request of the financial institution 110 without input by a host of the production server 140. The customer 160 may then access his or her on-line banking or other on-line financial accounts by accessing the on-line banking product 142 and the activated software product 146 (and/or add-on) on the on-line banking or production server 140 and interacting with screens or pages that are displayed to the customer 160.

Figure 3:
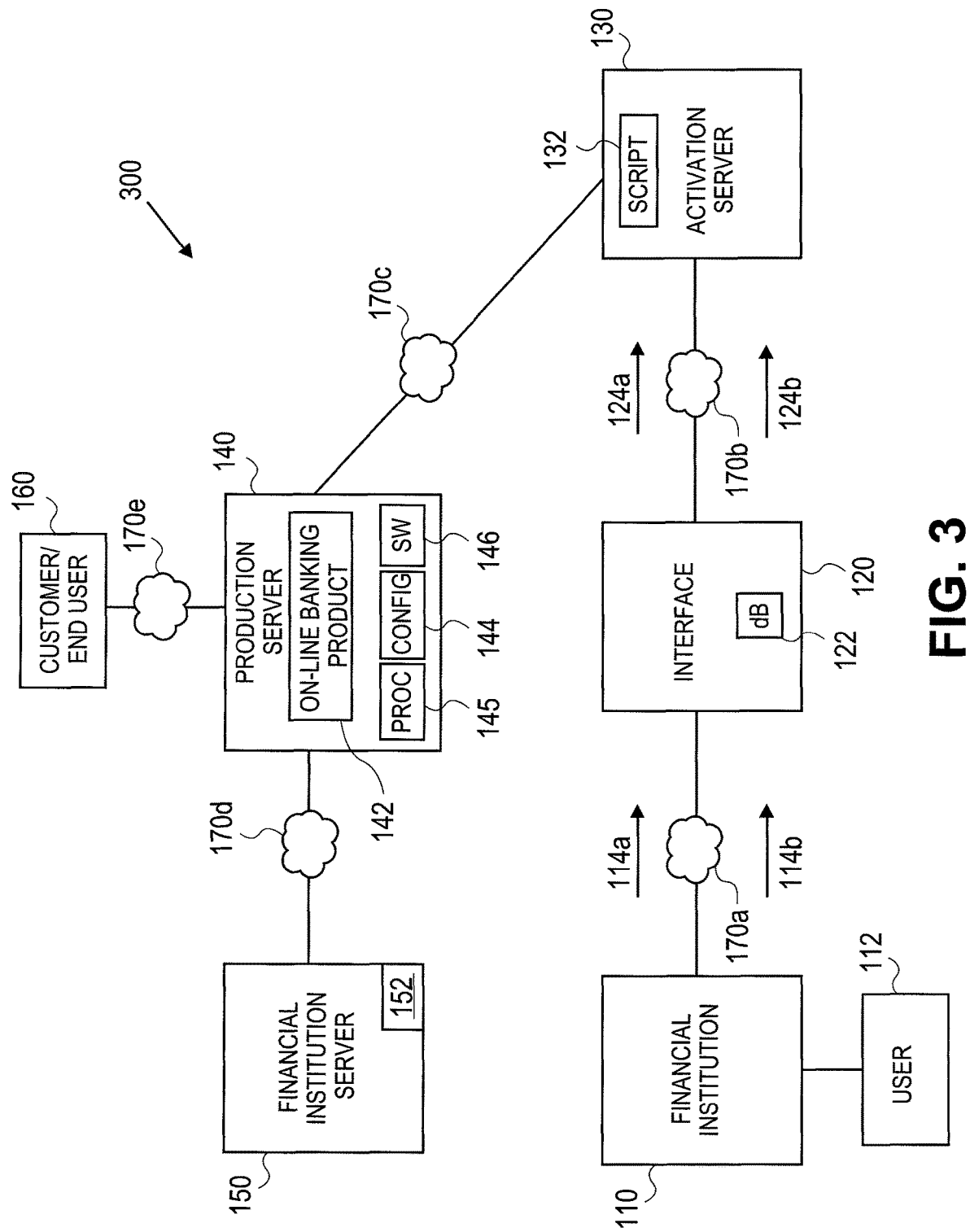
FIG. 3 is a block diagram of a system constructed according to one embodiment and illustrating one or more instructions or scripts on an activation server that are executed to modify a configuration of a production server hosting an on-line banking product such that the software product is available on a limited basis for selected customers and on a general basis for all customers.
Figure 4:
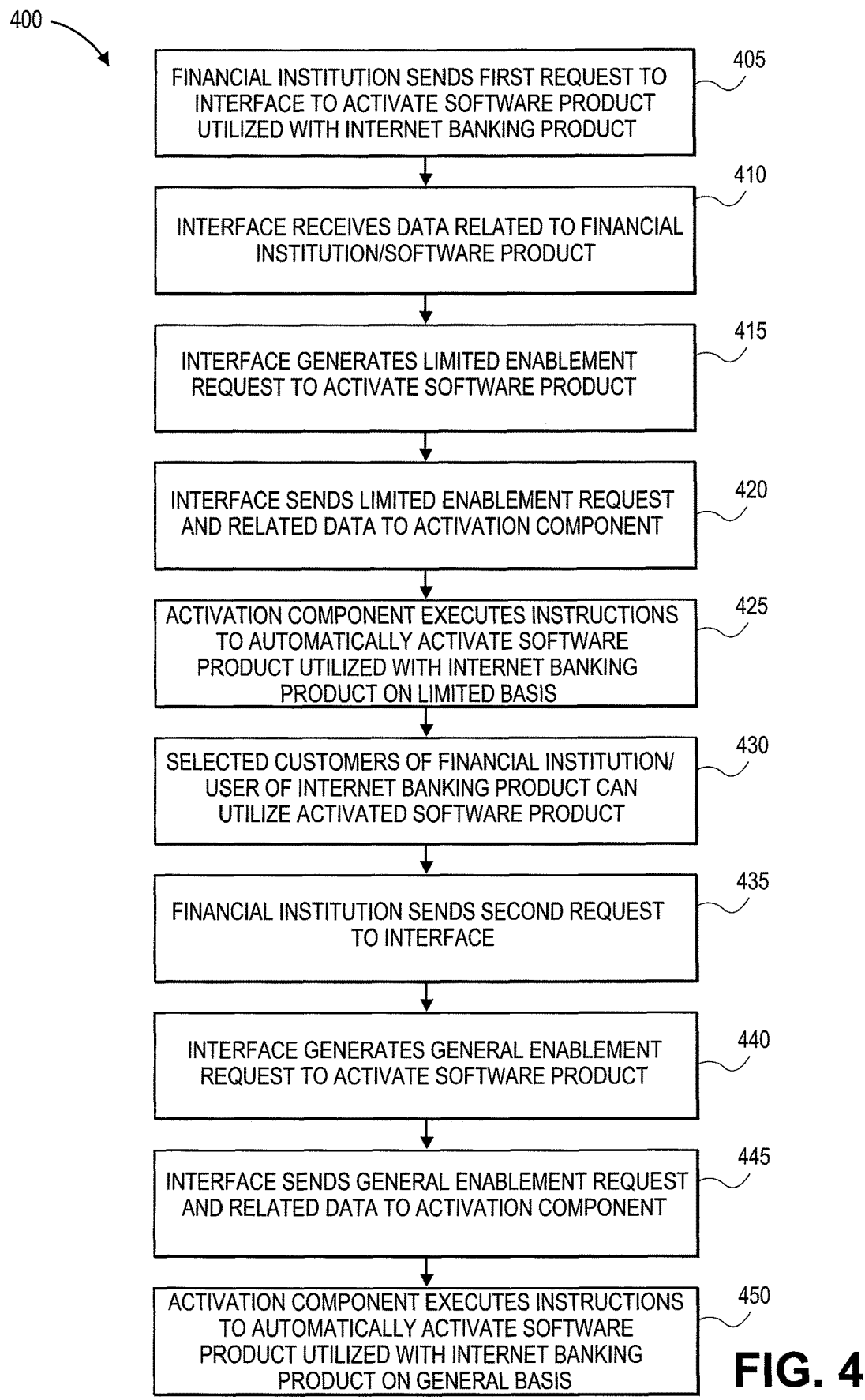
FIG. 4 is a flow chart of a method for automatically activating a software product in limited availability and general availability stages using the system illustrated in FIG. 3.

In another embodiment, using the system 300 shown in FIG. 3, a method 400 as shown in FIG. 4 for automatically activating a software product 146 that it utilized with, accessed through, or related to, an on-line banking product 142 that allows a customer 160 to conduct on-line banking or other finance transactions is a multi-stage method that includes different levels of customer 160 availability. Automatically activating a software product 146 while providing different levels of customer 160 availability may be useful for conducting a test of the software product 146 before it is released to larger set or all customers 160 or if automatic activation is intended to be limited to only certain customers 160.

Referring to FIG. 4, and with continuing reference to FIG. 3, at stage 405, the financial institution 110 sends a request 114a to automatically activate the software product 146. The request 114a is received at or through the interface 120 as discussed above with reference to FIGS. 1-2. At stage 410, data related to the request 114a is gathered by the interface 120, e.g., from the financial institution 110 or from another data source and stored in memory or a database 122. At stage 415, a limited enablement request 124a (or a first enablement request in the event limited activation precedes full or global activation as discussed in further detail below) is generated by the interface 120. At stage 420, the limited enablement request 124a is transmitted from the interface 120 to the activation server 130. As discussed above, an enablement request may also be considered to be a combination of requests 114a and 124a.

At stage 425, in response to the limited enablement request 124a, one or more instructions or scripts 132 are executed by or on the activation server 130. This triggers a processing or other suitable component 145 to create a configuration element 144 or modify an existing configuration element 144 on the production server 140 and automatically activate the software product 146 on a limited basis. Limited automatic activation is defined as activation for a limited number or select customers 160. The names or identities of customers 160 that are selected for limited activation may be determined from the limited enablement request 124 and/or from data in the database 122. At stage 430, the selected customer(s) 160 may then access their respective on-line banking or other on-line financial accounts by accessing the on-line banking product 142 and the automatically activated software product 146 on or accessed by the on-line banking or production server 140. According to one embodiment, stage 430 may be a test involving selected customers 160 to determine how the activated software product(s) 146 function. Further, stage 430 may complete the method 300 in the event that limited activation is the desired end result.

However, if it is desired to automatically activate the software product 146 for other customers 160, at stage 435, assuming the limited availability test is satisfactory, the financial institution 110 issues a second request 114b to the interface 120 to automatically activate the software product 146 for all of its customers 160. For this purpose, the interface 120 may, if necessary, receive additional data, generate a second or general enablement request 124b at stage 440, and send the general enablement request 124b to the activation server 430 at stage 445. As discussed above, an enablement request may also be considered to be a combination of requests 114b and 124b. At stage 450, one or more instructions or scripts 132 are executed by or on the activation server 430 in response to the second enablement request 124b to fully and automatically activate the software program 146 on a general or global basis for use by all customers 160 of the financial institution 110. All customers 160 may then access their respective on-line banking or other on-line financial accounts by accessing the on-line banking product 142 and the activated software product 146 (and/or add-on) on the on-line banking or production server 140 and interacting with screens or pages that are displayed to the customers 160. Further aspects of embodiments and example implementations of embodiments are described in further detail with reference are described with reference to FIGS. 5A-8.

Figure 5A:
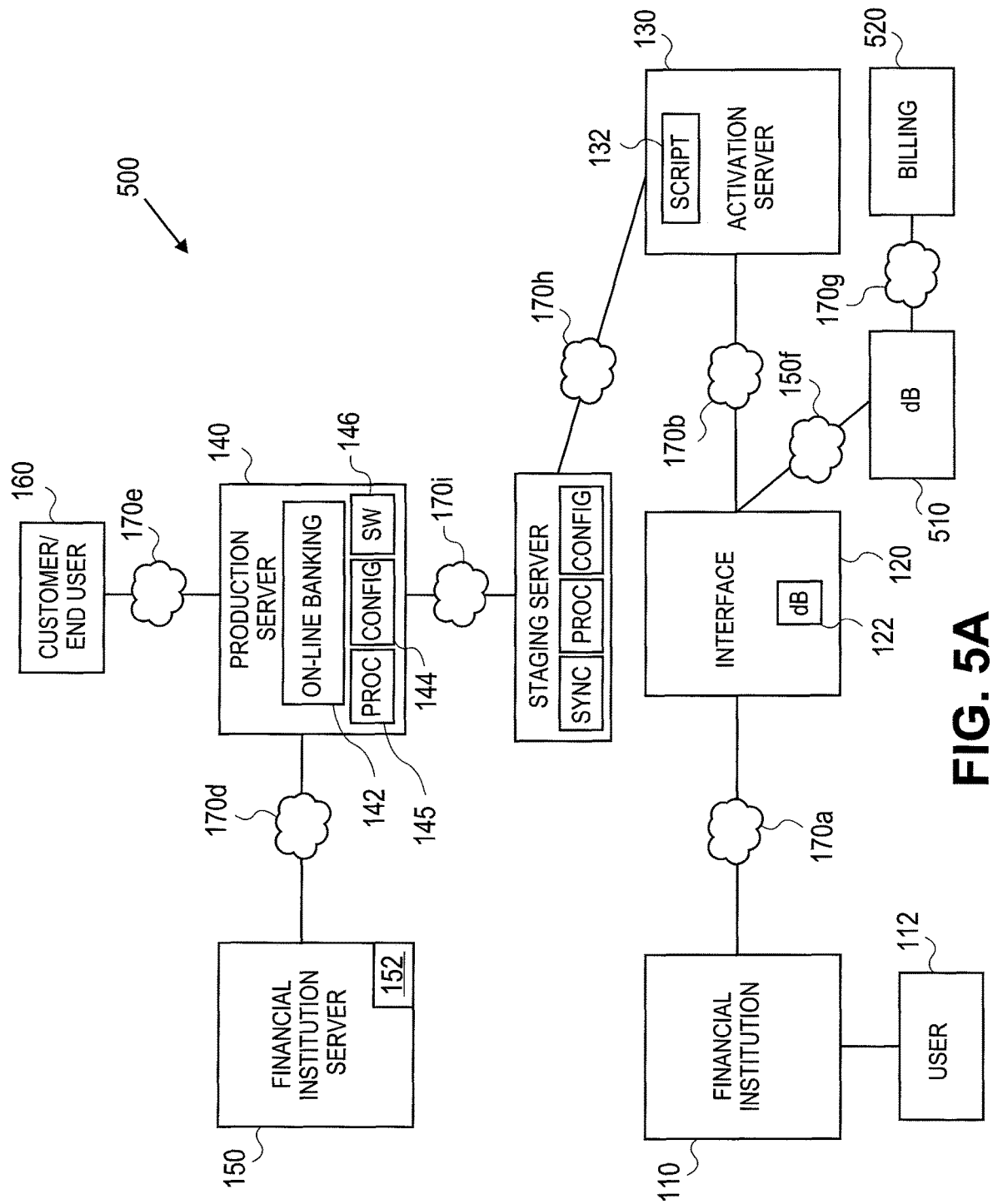
FIG. 5A is a block diagram of a system constructed according to another embodiment in which an intermediate configuration or staging server is operably coupled between an activation server and a staging or on-line banking server.

Referring to FIG. 5A, a system 500 constructed according to one embodiment includes a financial institution computer 110, which is used to drive automatic activation of software products 146 through the interface 120, which is also operably coupled to the activation server 130. The activation server 130 is operably coupled to or in communication with the production server 140. The activation server 130 is configured and designed to manage workflows and data input and processing by breaking tasks into steps and executing those steps in an order using, for example, scripts 132 and other executable instructions.

According to one embodiment, the interface 120 is an extranet site or website that provides for communications between the financial institution 110 and a host of the on-line banking or production server 140. Communications between system components are preferably secure given the nature of the information exchanged.

In one implementation, embodiments may be implemented using systems managed by Digital Insight, a unit of Intuit Inc., Mountain View, Calif. Digital Insight serves as a host for or provides a production server 140 and on-line banking products 142. In such systems, the interface 120, according to one embodiment, is an extranet site, one example of which is MyDI, which is available from Digital Insight. MyDI can be accessed by a financial institution 110 to manage the relationship of the financial institution 110 with Digital Insight, maintain contact and profile information, manage technical support requests or incidents, and manage implementation of software products. Further aspects of the MyDI interface 120 and applications thereof are described in "MyDI User Guide, Feature and Functionality Overview," October, 2008 (Appendix A), and "MyDI Training Webcast (Appendix B), the contents of which are incorporated herein by reference as though set forth in full. It should be understood, however, that other interfaces 120 may be utilized, and MyDI is provided as one example of an interface 120 that may be utilized to illustrate one manner in which embodiments may be implemented.

In the illustrated embodiment, the system 500 also includes a data source such as a database (db) 510, which may store data related to the financial institution 110 and/or the software product 146. This data may also be stored in the data store or database 122 of the interface 120. The database 122 may also be used for other purposes, e.g., for billing the financial institution 110 for the activated software product 146. According to one embodiment, the database 510 is a customer relationship database (CRM), one example of which is a CRM that is available from CDC Software, Atlanta, Ga. Other CRM databases may also be utilized. The database 510 may also include or be operably coupled to a billing server or component 520 through a network 170g.

The database 510 and/or billing component 520 may include prices for activating certain software products 146, pricing structures (e.g., based on time, number of users, etc.) and be operable to generate and send bills to the financial institutions 110 through the interface 120 for services and software products 146 that are provided by a host such as Digital Insight.

The embodiment of the system 500 illustrated in FIG. 5 also includes an intermediate configuration or staging server 530 (generally referred to as staging server) that is in communication with or operably coupled to the activation server 130 through a network 170h. The staging server 530 includes a configuration file 534 (shown in FIG. 5 as "config") that is created or modified using associated processing components 535 (shown in FIG. 5 as "proc") as a result of execution of one or more instructions or scripts 132 on or by the activation server 130. In the illustrated embodiment, the staging server 530 also includes a synchronization element 532 (shown in FIG. 5 as "sync") that is operable to push configuration 534 changes from the staging server 530 to the production server 140 through a network 170i. The production server 140 is operably coupled to or in communication with one or more financial institution servers 150, and one or more customers 160 conduct on-line banking or financial transactions by accessing the production server 140 and using the on-line banking product 142.

Figure 5B:
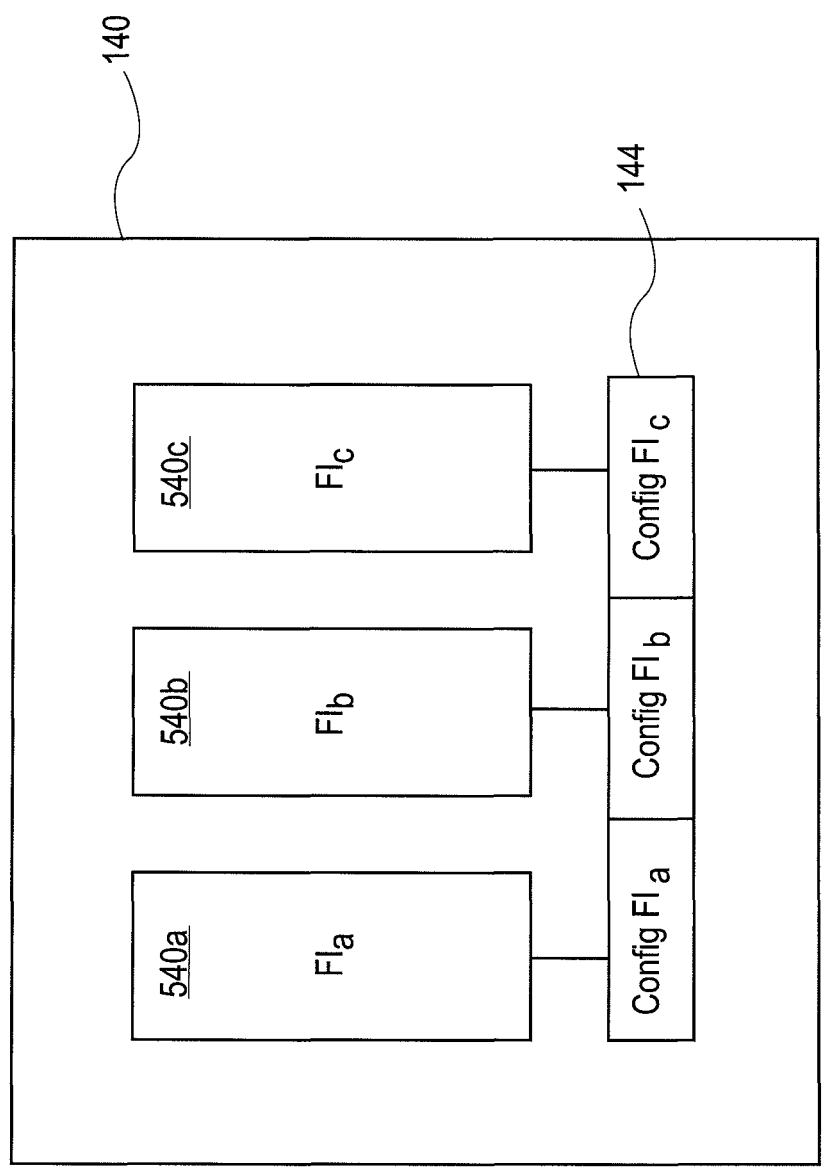
FIG. 5B generally illustrates that a production server may host sites for multiple financial institutions.

With further reference to FIG. 5B, the production server 140, which may be comprised of one server or multiple servers 140 (one production server 140 is illustrated), may include one or more sites, pages, files or directories 540a-c (generally sites 540) for different financial institutions 110 (FIa, FIb, FIc). Respective configurations or configuration changes 144 are made to respective sites 540 to selectively automatically enable a software product 146. In the illustrated embodiment, this is done using a single configuration element 144 that is applied to all of the sites 540. As shown in FIG. 5B, certain portions of the configuration element 144 may correspond to a particular site 540. For ease of explanation, reference is made generally to a production server 140 and automatically activating a software product 146 for a particular site 540 of a particular financial institution 110 by execution of a script 132, but it should be understood that a production server 140 (or servers) may serve multiple financial institutions 110, and that one or multiple configuration files 144 may be utilized and may be modified, reconfigured or created using one or more scripts 132.

Figure 6:
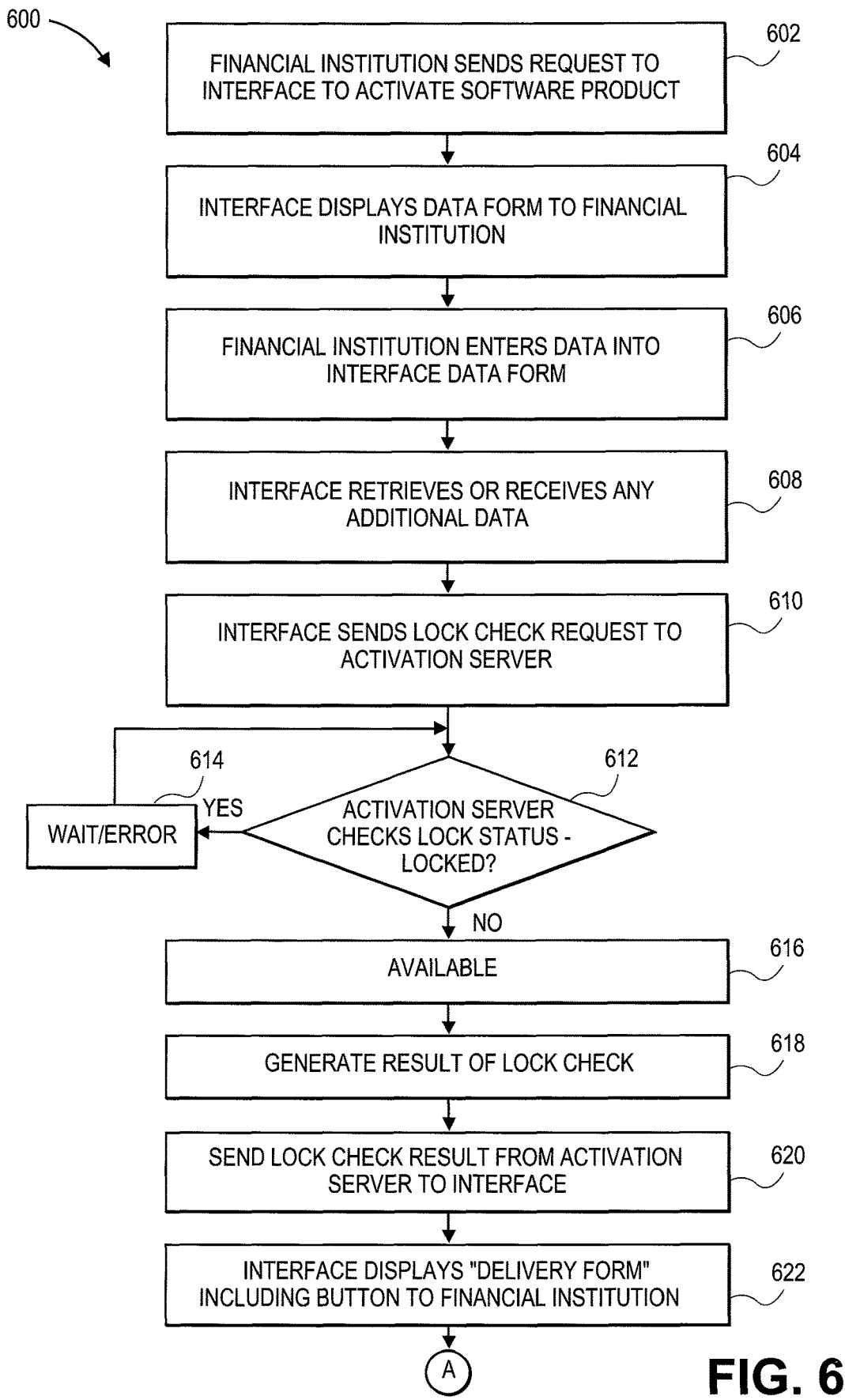
FIG. 6 is a flow chart illustrating in further detail a method for automatically activating a software product according t embodiments.
Figure 6:
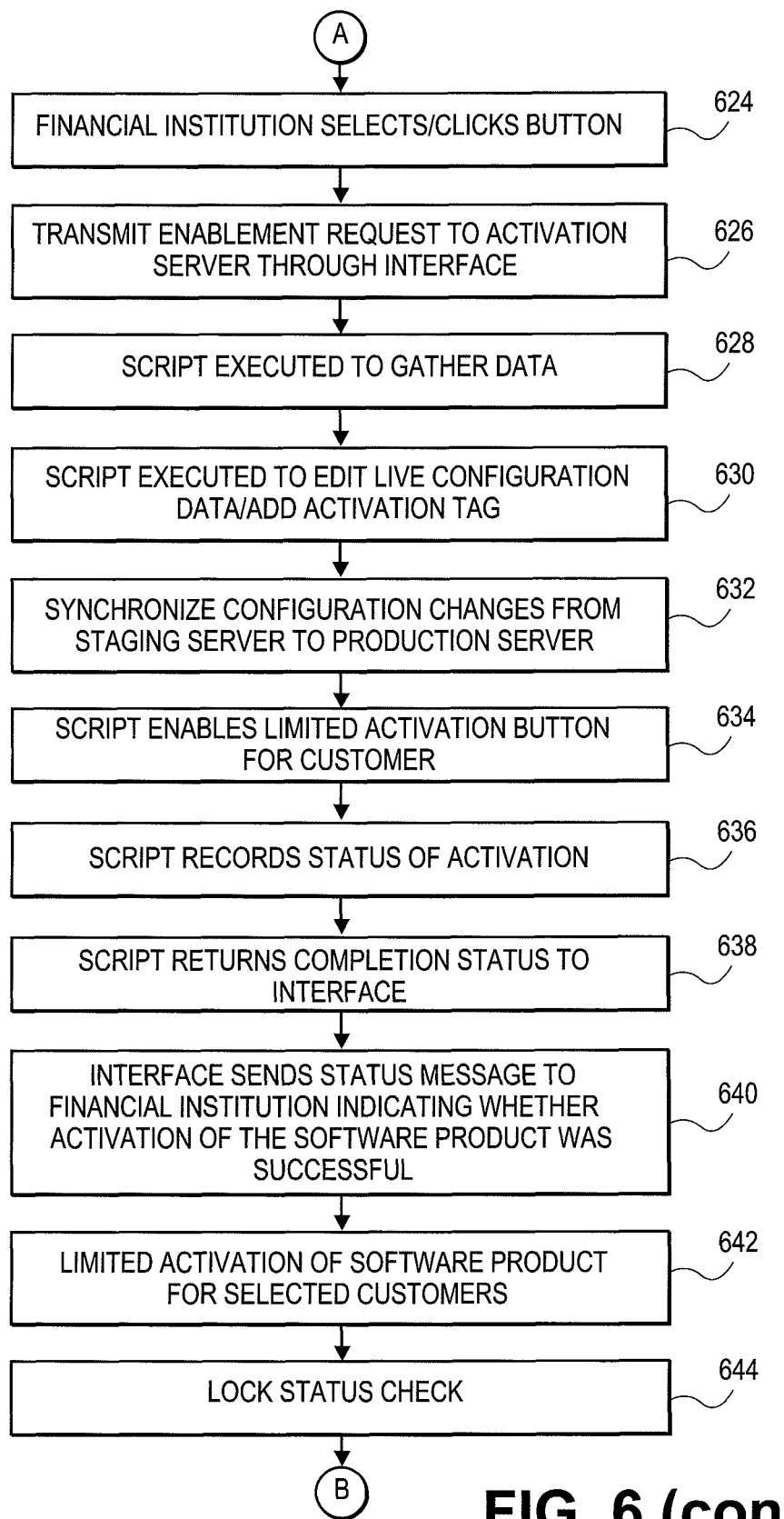
Figure 6:
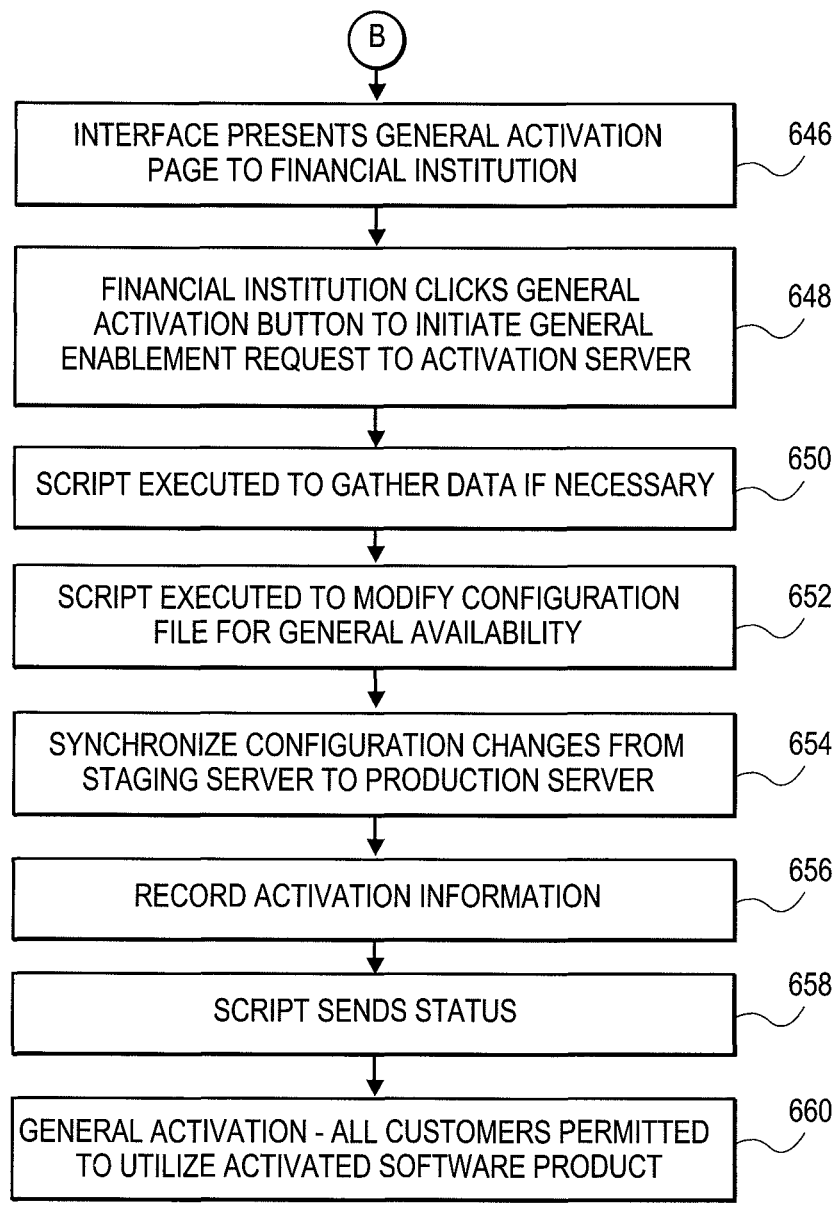

A method 600 for automatically activating a software product 146 or add-on related to an on-line banking product 142 using the system 500 shown in FIG. 5A is described with reference to FIG. 6 and the related system and flow diagrams shown in FIGS. 7A-F. These figures illustrate one embodiment in which activation occurs in stages, i.e., limited automated activation is followed by general automated activation. Other embodiments may be implemented as a single stage—limited activation only or general activation only. Further, embodiments may be implemented such that there are multiple limited activation stages rather than only a single limited activation stage. Accordingly, the following description is provided as an illustrative example of how embodiments may be implemented.

Figure 5C:
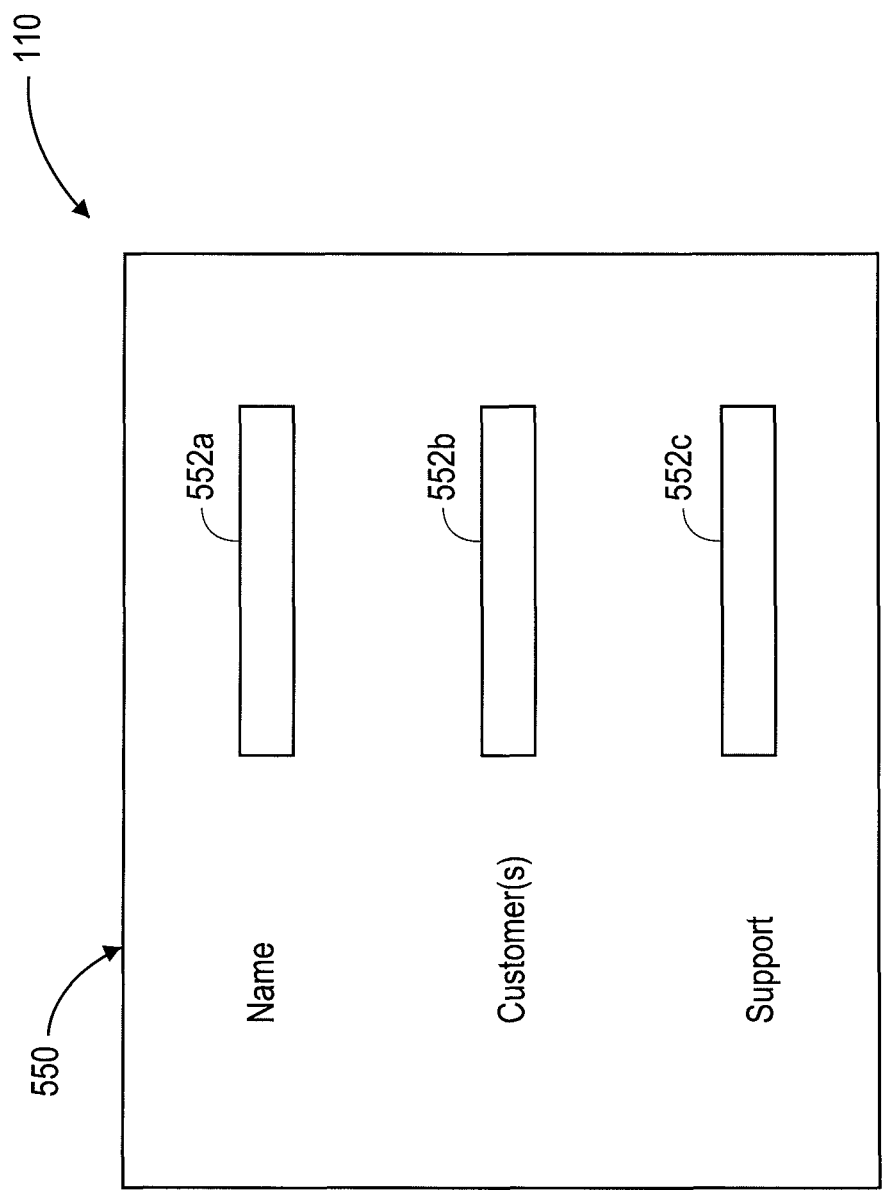
FIG. 5C generally illustrates a data input form generated by an interface and displayed to a financial institution.
Figure 5D:
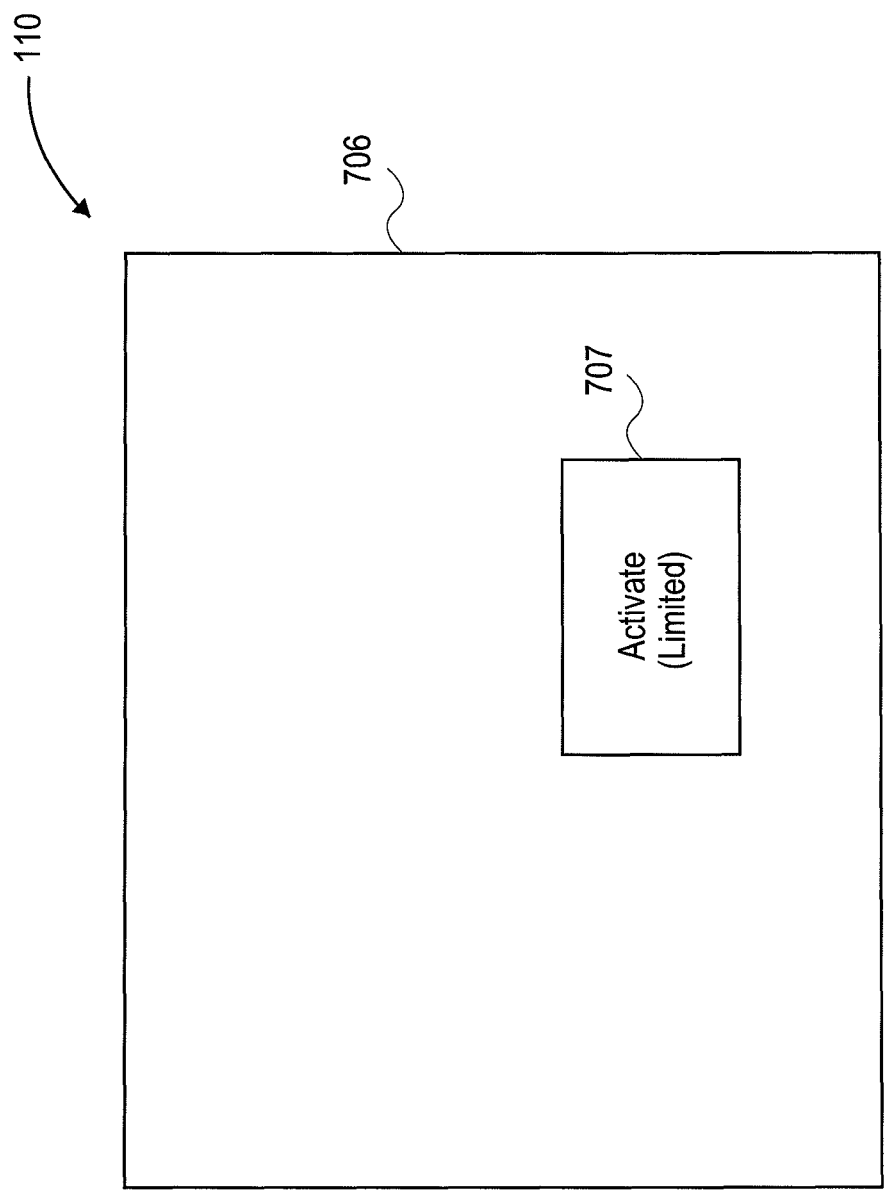
FIG. 5D generally illustrates how a financial institution may launch limited activation of a software product by selecting or clicking an icon or button.
Figure 7A:
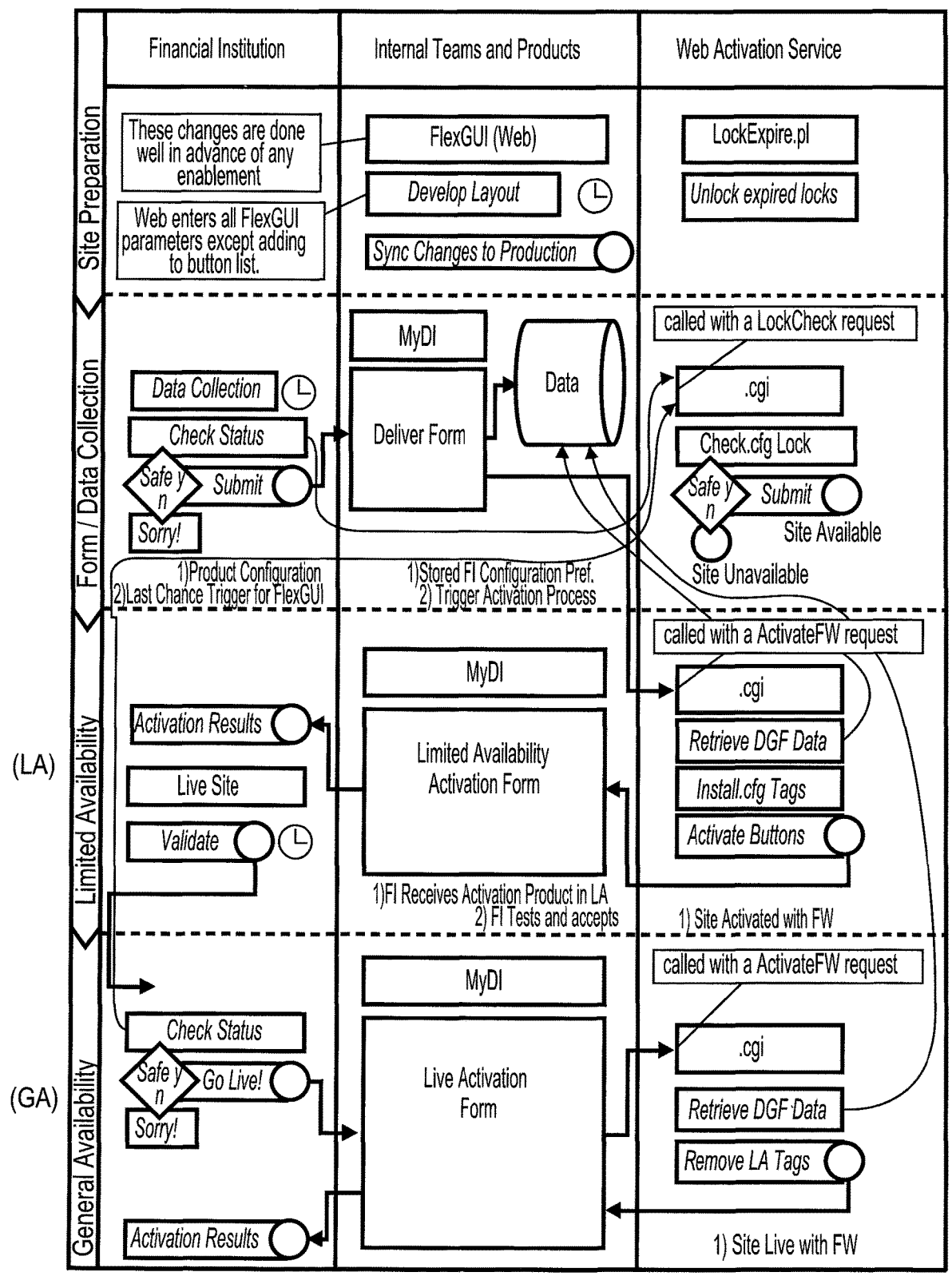
FIG. 7A is a system flow diagram showing steps and system components described with reference to FIGS. 5A and 6.
Figure 7B:
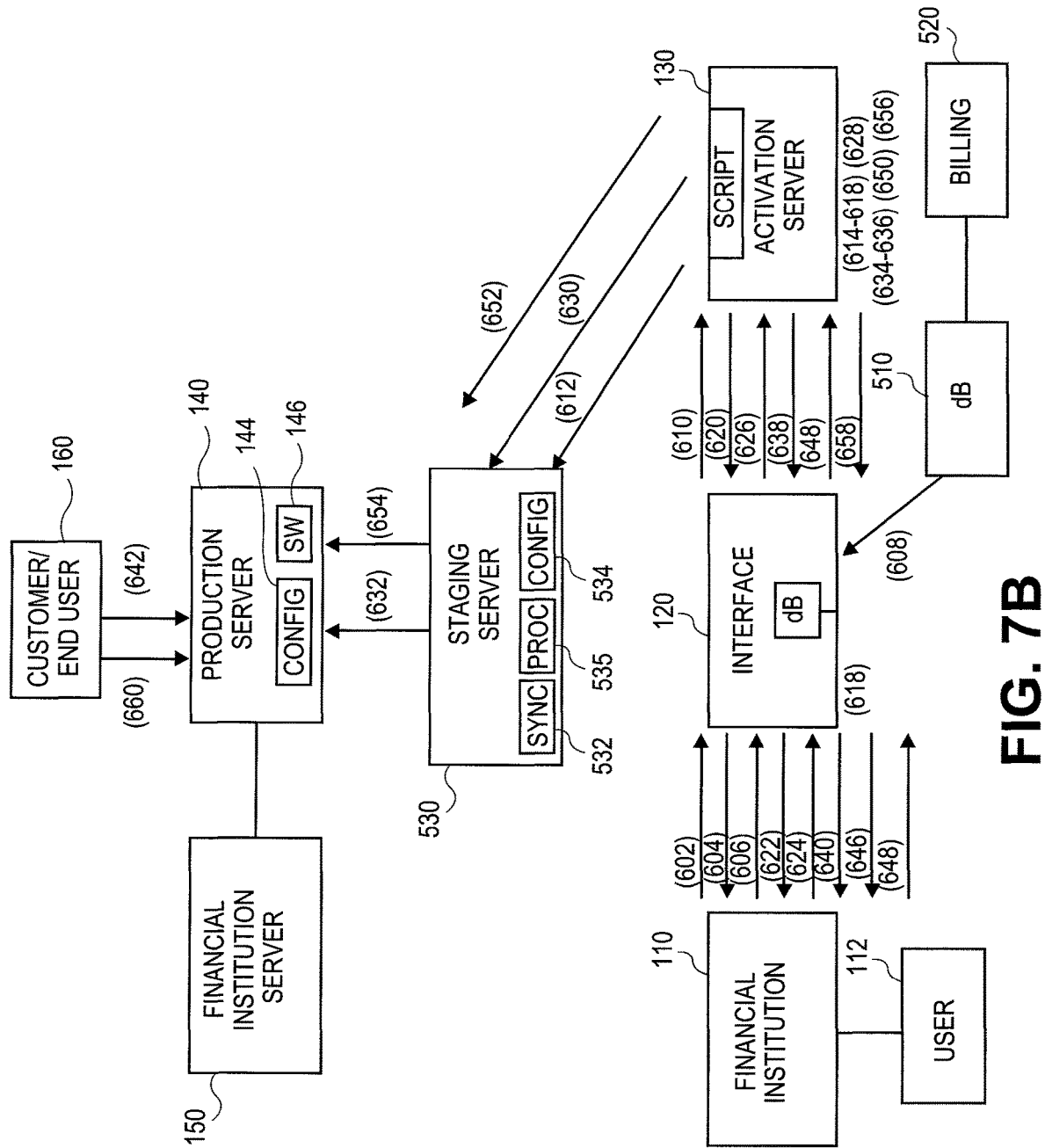
FIG. 7B is a system flow diagram based on FIGS. 5A and 6.
Figure 7C:
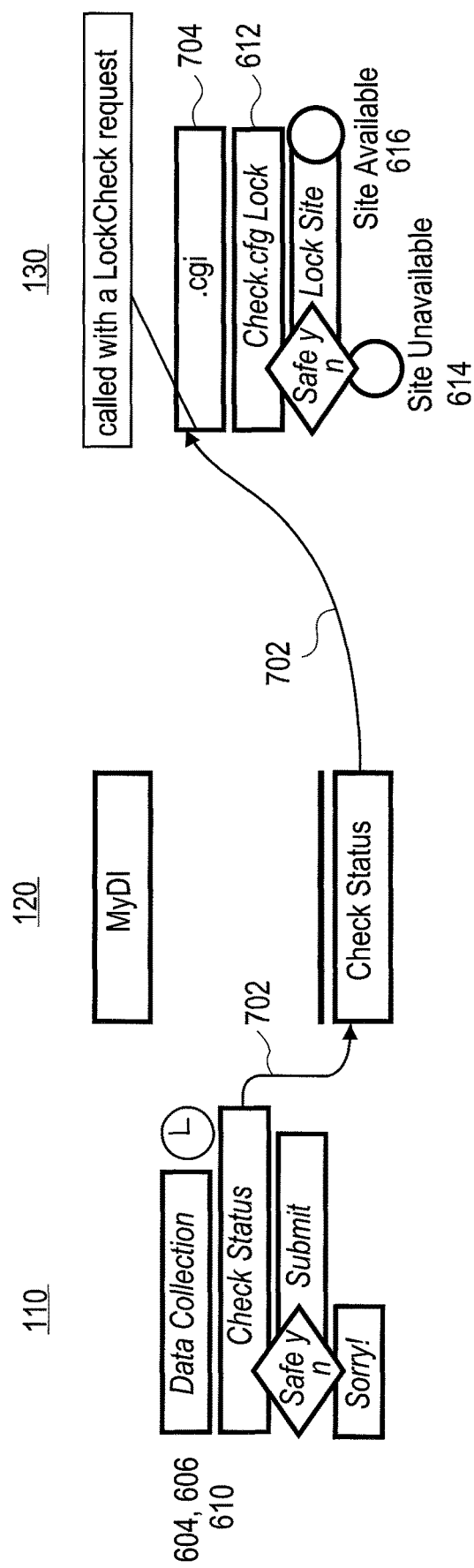
FIG. 7C illustrates portions of FIG. 7A that relate to preparations for limited activation of a software product.
Figure 7D:
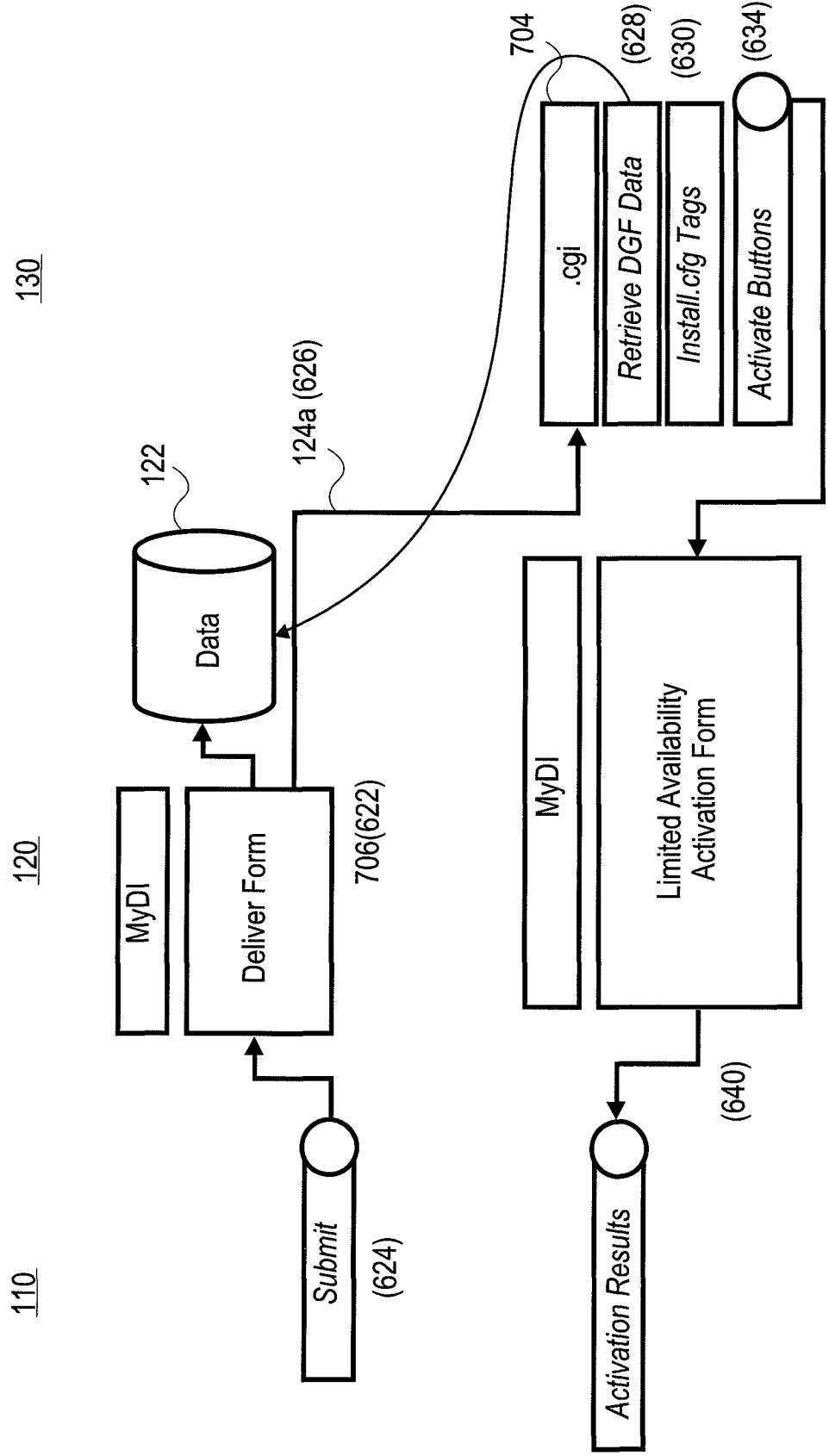
FIG. 7D illustrates portions of FIG. 7A that relate to limited activation of a software product.
Figure 7E:
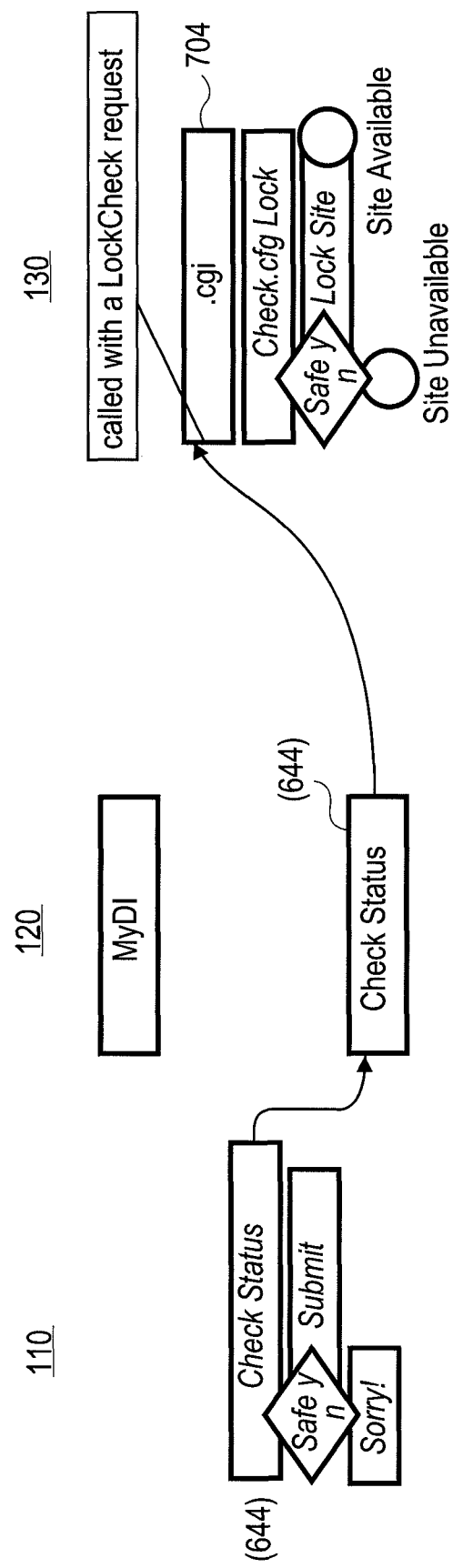
FIG. 7E illustrates portions of FIG. 7A that relate to preparations for general activation of a software product.
Figure 7F:
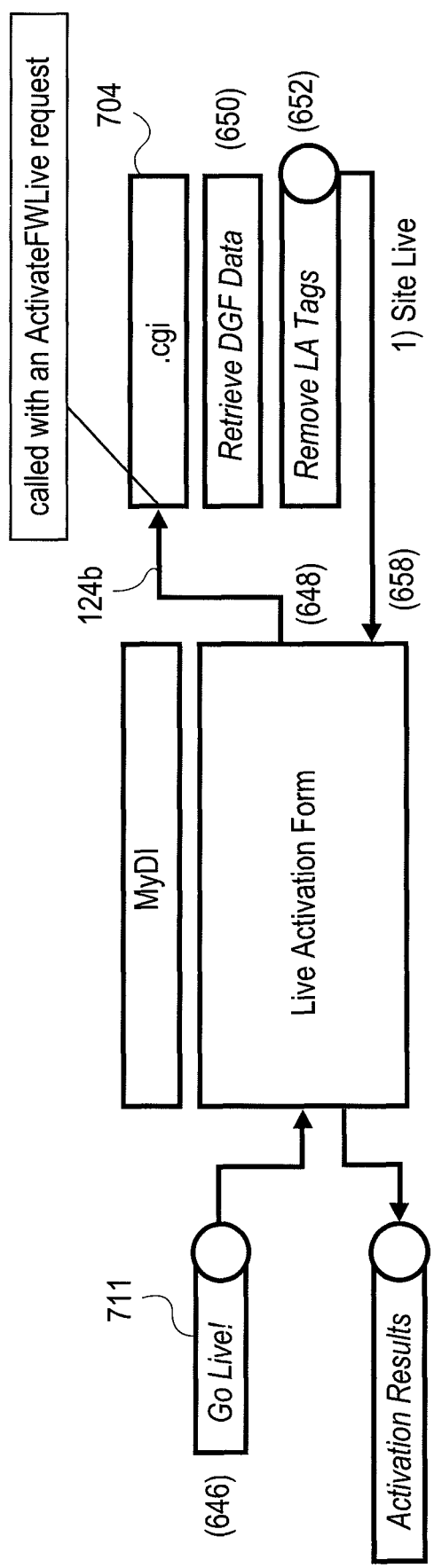
FIG. 7F illustrates portions of FIG. 7A that relate to general activation of a software product.

With reference to FIGS. 6 and 7A-C, one embodiment of a method 600 for automatically activating a software product 146 for use with an on-line banking product 142 based at least in part upon interaction or input of a financial institution 110 with an interface 120, such as an extranet site (e.g., MyDI) is illustrated. In the illustrated embodiment, the method 600 begins at stage 602 with the financial institution 110 sending a request or message 114a to the interface 120 to activate the software product 146. At stage 604, and as generally illustrated in FIGS. 5C and 7B, according to one embodiment, the interface 120 is operable to display to the financial institution 110 (to the user 112) a form 550 or other data gathering element. The form 550 is used by the interface 120 to collect data related to the request 114a. In the illustrated embodiment, the interface form 550 includes a field 552a for a name of the financial institution 110, one or more fields 552b for names of one or more customers 160 that are selected to utilize the software product 146 once activated, and a field 552c for support information such as a support phone number or e-mail address. In other embodiments, there may be separate fields for customers 160 that are selected for limited activation (LA), and another field for all of the customers 160 of the financial institution 110 that are selected for general activation (GA). Thus, FIG. 5C is provided to generally illustrate that the financial institution 110 enters data related to the request 114a, and that such information can include information such as names or identities of customers 160.

Referring again to FIGS. 6 and 7B, at stage 606, the financial institution 110 enters the requested data into the interface form 550, and the data is stored in the database 122 of the interface 120. At stage 608, if necessary, the interface 120 retrieves or receives any additional data relating to the financial institution 110 and/or the software product 146 from a data source 510, such as a CRM database or other database, and also stores that data in the database 122.

At stage 610, the interface 120 sends a request 702 to the activation server 130 for the activation server 130 to check a lock status ("LockCheck" request/"Check Status") of a configuration file 534 of the staging server 530 (or configuration of another component) to determine whether the configuration file 534 is locked or available for editing. For this purpose, a common gateway interface (cgi) file 704 or other suitable file, web service or database check may be utilized to broker or facilitate communications between the interface 120 and the activation server 130.

In one embodiment, the interface 120 generates a HTTP POST request containing a XML formatted LockCheck request for the particular financial institution 110 that is requesting enablement of the software product 146. According to one embodiment, the XML formatted request includes the following information: an identification of the financial institution 110 (or customer of the host), a stripped domain or abbreviated name identifying the financial institution 110, and a target region or environment in which the installation is being performed, which may be a pre-production, beta or production environment. The "RequestType" of the request is also set to LockCheck to indicate that lock status is being checked.

In embodiments in which Digital Insight hosts the on-line banking or production server 140, the identification of the financial institution 110 may be a unique Digital Insight Identification (DIID). As one example, the financial institution 110 may be Digital Federated Credit Union, which has a website address www.dcu.org. An abbreviated or stripped domain name or identifier would be "dcu". Types of target region information include, for example, on-lineserv, beta and preprod. "On-lineserv" refers to the production or customer facing application and is the software product that the customers 160 of the financial institution 110 use to access their bank accounts over the internet, for example. "Beta" refers to a customer facing application with limited access and may be used to test new versions of the software product or provide a preview of new features to bank employees. "Preprod" is a staging area where significant configuration changes are made prior to releasing them to on-linesery for public consumption. This allows more significant or major changes to be tested before release to a large number of customers 160.

One example of a XML lock check message or request that may be sent by the interface 120 to the activation server 130 for this purpose is as follows:

```
<tasks>
<task name = "LockCheck">
<parameters>
<parameter name="dinum" mydiquery=1>####</parameter>
<parameter name="statusid" mydiquery=1>####</parameter>
<parameter name="form_type_name" mydiquery=1>name of form</parameter>
<parameter name="qtype" mydiquery=1>qtype</parameter>
<parameter name="strippedDomain">domain</parameter>
<parameter name="region">region</parameter>
</parameters>
</task>
</tasks>
```

Referring again to FIG. 6, at stage 612, in response to the lock check request from the interface 120, the activation server 130 is triggered to check the lock status of the configuration file 534 while the interface 120 waits for a response from the activation server 130. During a lock check, the activation server 130 may perform various tasks including, for example, determining whether a "halt" hint parameter is set in the event that a hint file exists. A "halt" hint parameter is a parameter that is specific to the example involving configuration for activation of FinanceWorks (available from Digital Insight) and is used to provide hints to determine configurability when configuration specifics are non-determinant. For example, it may be difficult to compute whether or not a feature is actually turned on or turned off by simple parsing of the configuration file 634. More complex parsing of the configuration file 634 may be required. To address this issue, hints about the configuration of sites can be provided, for example, whether or not the site is fit for automated activation. A setting of "halt" may indicate, for example, that the site is not fit for automated activation according to embodiments.

At respective stages 614, 616, a failure message is generated if the configuration is locked, and a success or available message is generated if there is not a lock. For example, the activation server 130 may check whether there are any a web-based application freezes that include the site of the financial institution 110. AWETool is an example of a web-based application that was developed by Digital Insight and that may be utilized and that allows edits to a configuration file 634 of an Internet or on-line banking software product 142. Embodiments may involve other web-based applications, and AWETool is provided as one example of an application that may be used.

A failure message 614 may be generated if any such freezes exist. A further task may involve checking whether there are any AWETool session files in the on-linesery portion of the site of the financial institution 110. For example, since a user using AWETool may be editing a site that is being automatically configured and that presents a possible conflict, it may be desirable to prevent the automated activation until such time that the AWETool user has completed changes to the same configuration file. A failure message 614 may be generated if such session files exist. Otherwise, at stage 616, the configuration file 534 is available for editing, and a temporary session lock is generated, e.g., by creating a session file using a web-based application such as AWETool and that expires within a pre-determined time.

At stage 618, the result of the lock check is generated and encoded in a results tag that is embedded within a task tag, and at stage 620, a reply message is sent from the activation server 130 to the interface 120. One example of such a XML message is as follows:

```
<tasks>
<task name = "LockCheck">
<parameters>
<parameter name="dinum" mydiquery=1>####</parameter>
<parameter name="statusid" mydiquery=1>####</parameter>
<parameter name="form_type_name" mydiquery=1>name of form</parameter>
<parameter name="qtype" mydiquery=1>qtype</parameter>
<parameter name="strippedDomain">domain</parameter>
<parameter name="region">region</parameter>
</parameters>

<success/>
<failure/>
<message>Any message to pass back to the user</message>

</task>
</tasks>
```

Upon receiving this result, if the LockCheck is successful (indicating that the configuration file 534 on the stating server 530 is available for editing), then at stage 622, the interface 120 displays a "delivery form" or a page 706 (generally illustrated in FIG. 5D) that includes an action button 707 such as "deliver," "activate" or "enable," which can be pressed or selected by the financial institution 110 (e.g., using a keyboard and/or mouse) to initiate automated activation of the software product 146 on a limited availability basis.

According to one embodiment in which the software product 146 to be activated is FinanceWorks, a lock is established at the time of activation. The lock is checked, and if it is available, the financial institution user 112 is allowed to press the enable button 707. Between the time the lock was checked and when activation starts, it is possible that a lock from another application is established. In this case, the activation will fail and the user will need to relaunch the activation and repeat until successful.

Limited Availability

At stage 624, the financial institution 110 selects or clicks on the enabled activation button 707 (shown in FIG. 5D) such that at stage 626, an enablement request 124a is transmitted from the interface 120 to the activation server 130. As discussed above, a common gateway interface (cgi) file 704 may be utilized to broker or facilitate communication of the enablement request and other communications between the interface 120 and the activation server 130.

In the illustrated embodiment, the enablement request is a request to initially activate the software product 146 on a limited availability (LA) basis, i.e., for selected customers 160. Limited activation may be useful when the financial institution 110 is enabling the software product 146 for the first time or when activation is selected to be on a limited basis to test the functionality of the software product 146. The selected customers 160 for which the software product 146 is activated can be determined from the enablement request 124a, which includes data that was previously entered by the financial institution 110 and stored in the local database 122 that identified these customers 160. In an alternative embodiment, the selected customer data can be retrieved by the activation server 130 directly from the database 122.

In one embodiment, the enablement request 124a sent by the interface 120 to the activation serer 130 is a HTTP POST request to a cgi file 704 that contains an XML formatted request. For example, the enablement request 124a may be an HTTP POST request to a cgi file 704 that contains an XML formatted request. According to one embodiment, the software product 146 to be activated is FinanceWorks (FW), available from Digital Insight. Finance Works is powered by Quicken and is an on-line financial management program that combines aspects of Quicken and aspects of on-line banking such that a webpage of an on-line banking program may be utilized to access and manage accounts of multiple financial institutions (e.g., banks, credit cards, mortgages, loans, investment accounts, etc.) at the same time. In other words, account information from different financial institutions 110 can be displayed through a single web page such that all of the financial information of a particular customer 160 is available in a single place without having to log into multiple websites, some of which may or many not be secure. In this embodiment, the XML formatted request may be an XML formatted "ActivateFW" request that includes following types of information: a) stripped domain or abbreviate domain of the financial institution (e.g., "dcu" as in the prior example), b) target region (on-lineserv, beta, preprod), and c) Request Type, which is set to ActivateFW. Following is an example of a XML message that may be sent by the interface 120 to the activation server 130 to activate FinanceWorks (FW) for this purpose:

```
<tasks>
<task name = "ActivateFW">
<parameters>
<parameter name="dinum" mydiquery=1>####</parameter>
<parameter name="statusid" mydiquery=1>####</parameter>
<parameter name="form_type_name" mydiquery=1>name of form</parameter>
<parameter name="qtype" mydiquery=1>qtype</parameter>
<parameter name="strippedDomain">domain</parameter>
<parameter name="region">region</parameter>
</parameters>
</task>
</tasks>
```

In response to the enablement request 124a, at stage 628, a script 132 that is accessed by or on the activation server 130 is executed to gather data from the database 122 of the interface 120 as necessary. Examples of data that may be gathered include, but are not limited to a name of the financial institution, support information such as a phone number, and users allowed to be enabled. In the event that additional information is required, such as an identifier or DIID, the activation server 130 may be operable to execute one or more instructions or a script 132 that constructs a URL and generates a HTTP GET request.

At stage 630, in the illustrated embodiment, the script 132 is executed to edit the live configuration file 534 of the staging server 530, e.g., by adding activation tags to the configuration file 534 and integrating data that was collected from the interface database 122 as appropriate. Modifications to the configuration file 534 may identify the customers 160 that are allowed to use the software product 146, support information (e.g., a phone number), and a name or identifier of the financial institution 110, e.g., an abridged name such as "dcu" in the prior example.

At stage 632, these configuration file 534 changes or the modified configuration file 534 on the staging server 530 for limited activation are synchronized to the on-line banking or production server 140 that is accessible by the end users or customers 160. For this purpose, the configuration file 534 changes can be pushed to the configuration element 144 of the production server 140 via a synchronization element 532. One example of a synchronization element 532 that may be utilized for this purpose is skysync, which is a Digital Insight tool that is used to send staged changes to production. Thus, the synchronization element 532 synchronizes configuration settings in the configuration server 520 (which is not accessible to the customer 160) to the production server 140 (which may be accessed by a customer 160). After the session lock of the configuration file 534 of the staging server 530 (or other server that may be involved in configuration changes) is removed, the software product 146 is enabled or activated for use by the customer 160.

At stage 634, the activation script 132 enables a limited activation button or icon that enables the customer 160 to launch the software product 146 assuming the lock check is successful.

At stage 636, the script 132 records the status of the site activation in the database 122 of the interface 120 after each activity, and this information may include "delivery" setting, success or failure, and date/time.

At stage 638, the script 132 returns the completion status that reflects these results to the interface 120, which is waiting for a response from activation server 130 in real time. Following is one example of a XML message that may be sent by the activation server 130 to the interface 120 to indicate the result of limited activation of FinanceWorks (FW), and the result is encoded in the results tag that is embedded within a task tag:

```
<tasks>
<task name = "ActivateFW">
<parameters>
<parameter name="dinum" mydiquery=1>####</parameter>
<parameter name="statusid" mydiquery=1>####</parameter>
<parameter name="form_type_name" mydiquery=1>name of form</parameter>
<parameter name="qtype" mydiquery=1>qtype</parameter>
<parameter name="strippedDomain">domain</parameter>
<parameter name="region">region</parameter>
</parameters>

<success/>
<failure/>
<message>Any message to pass back to the user</message>

</task>
</tasks>
```

At stage 640, the interface 120 sends a status message to the financial institution 110 indicating whether activation of the software product 146 was successful or whether it failed in the event that further action or assistance is required. The script 132 may also generate an e-mail notifying someone of the actions taken and results.

At stage 642, assuming successful limited activation, the financial institution 110 allows the activated software product 146 to be utilized by the selected customers 160 in limited availability mode as a result of the selected customers 160 activating the software product 146 by selecting or pressing the limited activation button 707. At a later time, e.g., when the financial institution 110 is satisfied that the software product 146 functions as intended, the financial institution 110 may activate the software product 146 for all of its customers 160, in which case the financial institution 110 initiates a transition from limited availability to general availability.

General Availability

In embodiment in which limited availability is not the desired end result, continuing with stage 644, before a general or "go live" window or screen is generated by the interface 120 and displayed to the financial institution 110, a check of the lock status of a configuration file 144 that is to be generated or modified is performed by using a Lock-Check request as explained above. If the LockCheck test is not successful, a message may be generated to inform the financial institution 110 to check the lock status again later. If the LockCheck test is successful, then the configuration file 144 is locked with a session lock for a pre-determined time.

At stage 646, and as generally illustrated in FIG. 5E, the interface 120 presents to the financial institution 110 a form or page to "go live" for general activation rather than a form or page for limited activation. One embodiment of a procedure for displaying a general availability button 711 to the end user or customer 160 (e.g., as shown in FIG. 5E) is similar to the method of generating a limited availability button as described above, except that it may not be necessary to retrieve data from the database 122 since this information is already present, and it is not necessary to retrieve data regarding selected customers 160 since activation of the software product 146 on a general basis is for all customers 160 rather than certain or selected customers 160.

At stage 648, the financial institution 110 hits or clicks on the general activation button 711, thereby initiating transmission of a general enablement request 124b from the interface 120 to the activation server 130. For example, in one embodiment, the enablement request 124b sent by the interface 120 to the activation serer 130 is a HTTP POST request to a cgi file that contains an XML formatted request, e.g., a formatted ActivateFWLive request ("live" indicating general activation for all customers/end users 160) in the embodiment in which the software product 146 to be activated is Finance Works. It should be understood, however, that embodiments may also be applied to automatically activate other types of software products 146, and that Finance Works is provided as one example of a software product 146 that may be activated and one example of how embodiments can be implemented.

The XML formatted ActivateFWLive request and may include the following types of information: name, identifier or DIDD of the requesting financial institution, stripped domain or abbreviate domain of the financial institution (e.g., "dcu" as in the prior example), the target region (on-lineserv, beta, preprod), and a Request Type that is set to ActivateFWLive. The following is one example of a XML message that would be sent by the interface 120 to the activation server 130 to activate Finance Works (FW) on a general basis:

```
<tasks>
<task name = "ActivateFW">
<parameters>
<parameter name="dinum" mydiquery=1>####</parameter>
<parameter name="statusid" mydiquery=1>####</parameter>
<parameter name="form_type_name" mydiquery=1>name of form</parameter>
<parameter name="qtype" mydiquery=1>qtype</parameter>
<parameter name="strippedDomain">domain</parameter>
<parameter name="region">region</parameter>
</parameters>
```

```
</task>
</tasks>
```

At stage 650, in response to the enablement request 124*b*, a script 132 that is accessed by or on the activation server 130 is triggered and executed to gather data from the interface database 122 if necessary. In the general activation case, there ma not be additional data to be collected, but a request to the interface 120 for further data is made to verify, for security reasons, that the financial institution 110 has actually requested general activation of the software product 146 for all customers 160, and that the request did not originate from an unauthorized or external source.

At stage 652, the script 132 that is accessed by or on the activation server 130 is executed to create or, as in the illustrated embodiment, edit a live configuration file 534 of the staging server 530 based on the input of the financial institution 110. More particularly, the script 132 is executed to remove the ALLOWED USERS list value from the previously modified configuration file 534 (i.e., the selected customers 160 that were able to utilize the software program activated on a limited basis).

At stage 654, the modified configuration file 534 or changes thereto are pushed or synchronized to the on-line banking or production server 140, and the session lock on the configuration file 634 is released after the modifications for automatically activating the software product 146 are made.

At stage 656, the activation script 132 records information related to the site activation in a database 122 of the interface 120 including, for example, delivery setting, whether the activation was a success for a failure, and when (e.g., date and time) the activation occurred. Upon completion of the activation, the script 132 sends the status to the interface 120 at stage 658, which is waiting for a response from the activation server 130 in real time. The activation status is sent from or retrieved from the interface 120 by the financial institution 110, and if the activation was successful, then the software product 146 has been activated for use by end users or customers 160 of the financial institution 110 at stage 660. For example, a link or icon for the generally activated software product 146 can be included within a page generated by an on-line banking product 142 such that the customer 160 can access the activated software product 146 through the same secure on-line banking product 142. In this manner, a customer 160 is not required to access different software programs (some of which may not be secure or have security issues) and instead, can access such software programs using the same on-line banking product or program with which customers are familiar.

Thus, with embodiments, activation systems and methods are driven by a financial institution to enable or activate software products in an automated manner on a limited or general basis as opposed to support managers or technical support people of hosts of a production server that manually modify configuration files to manually activate software products or add-ons. These improvements are in response to input by the financial institution and automated interactions between the interface and the activation server, between the activation server and the configuration server, between the configuration server and the production server, and the execution of scripts on or accessed by the activation server to create configuration files, or implement configuration file changes. Further, embodiments allow for software products to be activated in less time using a consistent set of procedures that can be driven by various financial institutions to activate their respective software products at their own pace by following a web-based interface, which may include accompanying video or flash instructions.

Further, while these procedures are self-directed once initiated, progress that is made by a financial institution to activate the software product 146 can be monitored by the interface, which can send reminders or status summaries to the financial institution as needed to ensure that activation is progressing as planned or according to a schedule. Given these consistent procedures, repetitive aspects of configuring files for activation are automated, which provides for consistent methods and allows technical support people to focus on other aspects of the system. Additionally, embodiments utilize lock checks and sessions locks such that configuration files are modified at appropriate times to prevent configuration modifications from occurring at the same time.

Figure 8:
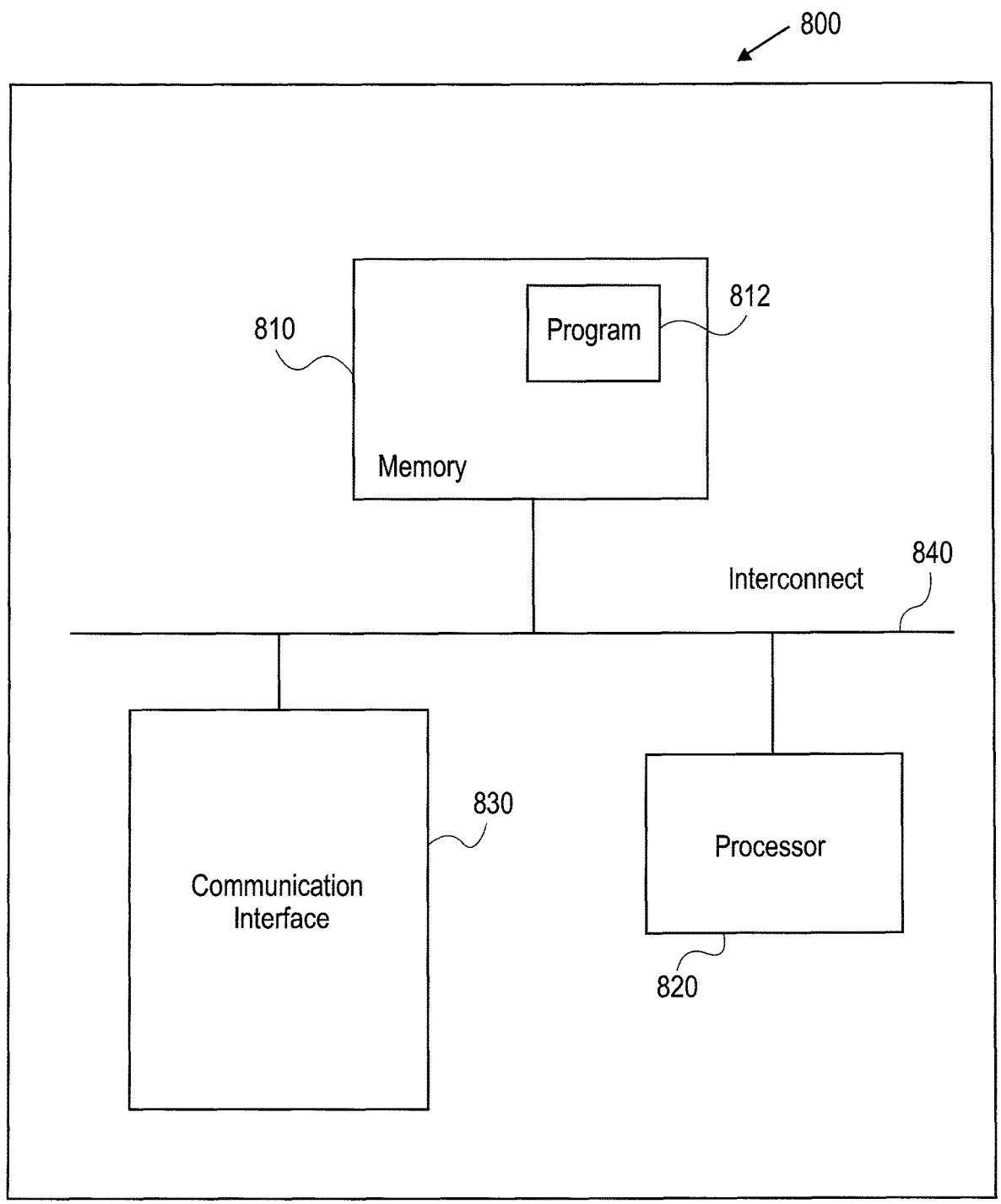
FIG. 8 is a block diagram of a computing apparatus or system in which various embodiments may be implemented or that may be utilized to execute various embodiments.

FIG. 8 generally illustrates certain components of a computing device 800 that may be utilized to execute embodiments and that includes a memory 810, program instructions 812, a processor or controller 820 to execute instructions 812, a network or communications interface 830, e.g., for communications with a network or interconnect 840 between such components. The memory 810 may be or include one or more of cache, RAM, ROM, SRAM, DRAM, RDRAM, EEPROM and other types of volatile or non-volatile memory capable of storing data. The processor unit 820 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 840 may include a system bus, LDT, PCI, ISA, or other types of buses, and the communications or network interface may, for example, be an Ethernet interface, a Frame Relay interface, or other interface. The network interface 830 may be configured to enable a system component to communicate with other system components across a network which may be a wireless or various other networks. It should be noted that one or more components of computing device 800 may be located remotely and accessed via a network. Accordingly, the system configuration provided in FIG. 8 is provided to generally illustrate how embodiments may be configured and implemented.

Method embodiments or certain steps thereof, some of which may be loaded on certain system components, computers or servers, and others of which may be loaded and executed on other system components, computers or servers, may also be embodied in, or readable from, a tangible medium or computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 820 performs steps or executes program instructions 812 within memory 810 and/or embodied on the carrier to implement method embodiments.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

For example, which certain embodiments are described with reference to automated activation of FinanceWorks, it should be understood that FinanceWorks is one example of a software product that can be activated according to embodiments. Embodiments may also be applied to activate various other types and numbers of software products and other types of personal and business software products 146 that may be used for finance, tax, accounting and/or banking purposes.

Further, it should be understood that production servers can include one or multiple servers that host sites or pages for various banks. In certain embodiments, a given software product is activated for all of the sites. In other embodiments, a given software product is activated for only certain financial institutions. Additionally, a database, such as a CRM database, may reside on one or multiple servers. Further, billing systems and methods for software products that are activated automatically can be based on various criteria including, for example, the number of customers or end users that access the product, the frequency with which the software product utilized. Moreover, various interfaces may be utilized to allow a financial institution to drive activation of a software product.

Additionally, although various XML messages are provided as examples of communications between certain components, it should be understood that other XML messages can be utilized, and that other formats may also be utilized.

Further, while multiple embodiments and variations of the many aspects of the invention have been disclosed and described herein, such disclosure is provided for purposes of illustration only. Where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process as well as performed sequentially. Thus, the methods shown in FIGS. 2, 4 and 6 are not intended to be limited to a particular sequential order.

Accordingly, embodiments are intended to exemplify alternatives, modifications, and equivalents that may fall within the scope of the claims.

What is claimed is:

1. A computer-implemented method for activating a software product for use by a customer of a financial institution, the method comprising:

before the software product is activated and made available to a computer of the customer, an interface computing element receiving a first request from a computer of the financial institution through a first network to activate the software product for use by the customer computer, wherein the interface computing element is accessible by the financial institution computer but not the customer computer, and the software product to be activated is to be used with or supplement an on-line banking product utilized by the customer computer and that provides the customer computer with on-line access to an account the customer has with the financial institution, the on-line banking product being hosted by an on-line banking server of a third party host;

before the software product is activated and made available to the customer computer, the interface computing element transmitting a second request through a second network to an activation server, the activation server being in communication with the on-line banking server through a third network; and the activation server executing one or more instructions to modify a configuration element of the on-line banking server and to automatically activate the software product based at least in part upon the second request such that the activated software product is then available for use by the customer computer when the customer computer accesses the on-line banking server.

2. The method of claim 1, wherein activation of the software product is driven by the financial institution through the interface computing element without manual input by the third party host.

3. The method of claim 1, the interface computing element comprising an extranet site of the third party host that provides for secure communications between the financial institution computer and the interface computing element of the third party host.

4. The method of claim 1, the second request comprising a request by the interface computing element for the activation server to determine a lock status of the configuration element of the on-line banking product before the software product has been activated and is available for use by the customer computer.

5. The method of claim 1, the second request comprising data collected utilizing the interface computing element, the method further comprising:

receiving, at the interface computing element and from at least one of the financial institution computer and a database, data related to one or more of the financial institution, the software product to be activated, and the customer; and the interface computing element generating a page that is displayed to a user of the financial institution computer and that allows the user of the financial institution computer to launch automatic activation of the software product.

6. The method of claim 5, the page displayed to the user of the financial institution computer comprising a button that is selected or pressed by the user to initiate activation of the software product on a limited basis for some, but not all, of the customers of the financial institution.

7. The method of claim 5, the page displayed to the user of the financial institution computer comprising a button that is selected or pressed by the user to initiate activation of the software product on a general basis for all of the customers of the financial institution.

8. The method of claim 5, before the page is displayed to the user of the financial institution computer, further comprising:

the activation server checking the lock status of the configuration file; and the interface computing element, while waiting for the response from the activation server, checking a parameter concerning activation of the software product.

9. The method of claim 8, further comprising the interface computing element receiving the response from the activation server indicating whether the configuration file is available for editing, wherein the page that allows the financial institution to launch automatic activation of the software product is displayed to the user of the financial institution computer after the interface computing element receives the response from the activation server.

10. The method of claim 1, further comprising the interface computing element:
sending data related to one or more of the financial institution, the software product and the customer from the interface to a database; and
billing the financial institution for the activated software product based at least in part upon data in the database.

11. The method of claim 1, wherein the software product is automatically activated by the activation server executing a script that modifies the configuration element based at least in part upon the second request received from the interface computing element.

12. The method of claim 1, wherein the activation server executes one or more instructions to modify a configuration element on the on-line banking server.

13. The method of claim 1, wherein the configuration element is stored on a configuration server that is in communication between the on-line banking server and the activation server, the software product hosted by the on-line banking server being automatically activated according to the configuration element being modified on the configuration server.

14. The method of claim 1, wherein the on-line banking server hosts an on-line banking product for a plurality of financial institutions at which respective customers have respective accounts, the software product being automatically activated for customers of multiple financial institutions based at least in part upon respective requests received by the interface from respective financial institution computers.

15. The method of claim 1, the software product comprising a financial software product that is accessible by the customer through a website generated by the on-line banking product utilized by the customer for on-line access to the customer's account.

16. The method of claim 1, the software product being initially automatically activated on a limited basis for selected customers of the financial institution, and subsequently automatically activated on a general basis for all customers of the financial institution.

17. The method of claim 16, wherein the user of the financial institution computer selects customers for which the software product is automatically activated on the limited basis.

18. The computer-implemented method of claim 1, the software product comprising a check imaging software product.

19. The computer-implemented method of claim 1, wherein the financial institution controls a pace at which the software product is activated.

20. The system of claim 1, wherein the financial institution controls a pace at which the software product is activated.

21. The method of claim 1, further comprising the interface computing element:
receiving data comprising identities of customers selected by the financial institution and for whom the software product is to be activated, wherein after the configuration element of the on-line banking server has been modified, the software product is automatically activated on a limited basis for the selected customers but not other customers of the financial institution.

22. The method of claim 1, the configuration element being modified by the executed instructions adding an activation tag to the configuration element.

23. The method of claim 22, the activation tag identifying the customer for which the software product is to be automatically activated.

24. The method of claim 1, further comprising the interface computing element receiving data comprising identities of all customers of the financial institution for whom the software product is to be activated, wherein after the configuration element of the on-line banking server has been modified, the software product is automatically activated on the general basis for all customers of the financial institution.

25. The method of claim 24, the page displayed to the user of the financial institution computer comprising a button that is selected or pressed by the user to initiate activation of the software product on a general basis for all customers of the financial institution.

26. The method of claim 1, wherein neither the interface nor the activation server is accessible by the customer, and the financial institution selects the customer for which the software product is to be activated.

27. The method of claim 1, further comprising the activation server notifying the interface computing element regarding software product activation, and the interface computing element transmitting an electronic message to the financial institution computer indicating whether activation of the software product was successful.

28. The method of claim 1, further comprising the interface computing element:
monitoring progress that has been made by the financial institution toward activating the software product; and
sending a reminder to the financial institution computer regarding activation of the software product based at least in part upon the progress made toward activating the software product.

29. A system for activating a software product for use by a customer of a financial institution, comprising:
an activation server in communication with an on-line banking server through a first network;
a financial institution computer; and
an interface computing element in communication with the financial institution computer through a second network and with the activation server through a third network,
the interface computing element being accessible by the financial institution computer but not the customer computer, the interface computing element being configured to receive first request to activate the software product for use by the customer from the financial institution computer before the software product is activated and made available to the customer, wherein the software product to be activated is to be used with or supplement an online banking product utilized by the customer and that provides the customer with on-line access to an account the customer has with the financial institution, the on-line banking product being hosted by an on-line banking server of a third party host, the interface computing element being further configured to transmit a second request to the activation server before the software product is activated and made available to the customer, wherein one or more instructions by the activation server are executed to modify a configuration element of the on-line banking server to automatically activate the software product based at least in part upon the second request such that the activated software product is then available for use by the customer computer when the customer computer accesses the on-line banking server.

30. The system of claim 29, wherein activation of the software product is driven by the financial institution through the interface computing element without manual input by the third party host.

31. The system of claim 29, the interface computing element comprising an extranet site that is hosted by the third party host.

32. The system of claim 29, the second request comprising a request by the interface computing element for the activation server to determine a lock status of the configuration element of the on-line banking product before the software product has been activated and is available for use by the customer computer.

33. The system of claim 29, the second request comprising data collected utilizing the interface computing element, wherein the interface computing element is operable to receive data related to one or more of the financial institution, the software product to be activated and the customer and display to a user of the financial institution computer a page that allows the user of the financial institution computer to launch activation of the software product.

34. The system of claim 29, the activation server comprising a script, wherein one or more instructions of the script are executable by the activation server to modify the configuration element to automatically activate the software product based at least in part upon the second request received from the interface computing element.

35. The system of claim 29, wherein the one or more instructions on the activation server are executed to modify a configuration element of the on-line banking product and on the on-line banking server to automatically activate the software product.

36. The system of claim 35, further comprising a configuration server that hosts the configuration element, the configuration server being in communication between the on-line banking server and the activation server, wherein the software product hosted by the on-line banking server is automatically activated according to the modified configuration element on the configuration server.

37. The system of claim 29, wherein the on-line banking server hosts an on-line banking product for a plurality of financial institutions at which respective customers have respective accounts, and the activation server is operable to automatically activate the software product for customers of one or more selected financial institutions based at least in part upon respective requests received by the interface from respective financial institution computers.

38. The system of claim 29, wherein the activation server is operable to automatically activate the software product selected by a user of the financial institution computer on a limited basis for selected customers of the financial institution, and subsequently automatically activate the software product on a general basis for all customers of the financial institution.

39. The system of claim 38, wherein the selected customers are selected by the financial institution.

40. The system of claim 29, the software product comprising a financial software product that is accessible by the customer computer through the on-line banking server utilized by the customer computer.

41. The system of claim 29, the software product comprising a check imaging software product.

42. A computer program product comprising a non-transitory computer program carrier readable by a computer and embodying one or more instructions executable by the computer to perform method steps for activating a software product for use by a customer of a financial institution, the method steps comprising:

before the software product is activated and made available to a computer of the customer, an interface computing element receiving, through a first network a first request from a computer of the financial institution to activate the software product for use by the customer computer, wherein the interface computing element is accessible by the financial institution computer but not the customer computer, and the software product to be activated is to be used with or supplement an on-line banking product utilized by the customer computer and that provides the customer with on-line access to an account the customer has with the financial institution, the on-line banking product being hosted by an on-line banking server of a third party host;

before the software product is activated and made available to the customer computer, the interface computing element transmitting a second request through a second network to an activation server, the activation server being in communication with the on-line banking server through a third network; and the activation server executing one or more instructions on the activation server to communicate with the on-line banking server through a third network to modify a configuration element of the on-line banking server to automatically activate the software product based at least in part upon the second request such that the activated software product is then available for use by the customer computer when the customer computer accesses the on-line banking server.

* * * * *